United States Patent
Norrie

(10) Patent No.: US 7,995,696 B1
(45) Date of Patent: Aug. 9, 2011

(54) SYSTEM AND METHOD FOR DESKEWING DATA TRANSMITTED THROUGH DATA LANES

(75) Inventor: Christopher I. W. Norrie, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 542 days.

(21) Appl. No.: 12/188,195

(22) Filed: Aug. 7, 2008

(51) Int. Cl.
*H04L 25/00* (2006.01)
*H04L 25/40* (2006.01)
(52) U.S. Cl. ......... 375/372; 375/371; 327/100; 713/500
(58) Field of Classification Search .......... 375/371, 375/372; 327/100; 713/500
See application file for complete search history.

(56) References Cited

U.S. PATENT DOCUMENTS

| | | | |
|---|---|---|---|
| 6,690,757 B1 | 2/2004 | Bunton et al. | |
| 6,865,231 B1 | 3/2005 | Bunton et al. | |
| 6,961,347 B1 | 11/2005 | Bunton et al. | |
| 6,985,502 B2 | 1/2006 | Bunton et al. | |
| 7,010,607 B1 * | 3/2006 | Bunton | 709/228 |
| 7,082,504 B2 | 7/2006 | Rojas et al. | |
| 7,092,629 B2 | 8/2006 | Bunton et al. | |
| 7,197,100 B2 | 3/2007 | Bunton et al. | |
| 7,230,549 B1 | 6/2007 | Woodral et al. | |
| 7,242,736 B2 | 7/2007 | Schanke et al. | |
| 7,809,969 B2 * | 10/2010 | Das Sharma et al. | 713/324 |

* cited by examiner

*Primary Examiner* — Ted M Wang
(74) *Attorney, Agent, or Firm* — Kenneth Glass; Stanley J. Pawlik; Glass & Associates

(57) ABSTRACT

A communication system includes a transmitter that transmits multiple data streams to a receiver in the communication system. Each of the data streams includes data and a skip ordered set. The receiver includes a data buffer for each data stream that stores a minimal skip ordered set based on the skip ordered set in the data stream received by the data buffer. Each of the minimal skip ordered sets has a same number of symbols. Additionally, each buffer stores data of the data stream received by the data buffer. The receiver aligns the data among the data buffers based on the minimal skip ordered sets in the data buffers and outputs the aligned data. In this way, the receiver deskews the data in the data streams.

24 Claims, 25 Drawing Sheets

SYSTEM AND METHOD FOR DESKEWING DATA TRANSMITTED THROUGH DATA LANES

BACKGROUND

In some types of communications systems, a transmitter converts a sequence of data symbols into multiple serial data streams and transmits the serial data streams over multiple data lanes to a receiver by using a transmit clock signal. The receiver reconstructs the transmit clock signal of the transmitter for each data lane based on the data stream received from the transmitter in that data lane. Although the reconstructed clock signals have the same average frequency as the transmit clock signal over a sufficiently long time period, the frequency of each reconstructed clock signal may independently drift away from the average frequency in shorter time periods because of changing conditions in the data lanes. For example, an impedance of a data lane may vary over time and affect the propagation delay of the data stream transmitted through that data lane.

The receiver converts data in each data stream into data symbols and stores the data symbols into a corresponding elastic buffer based on the reconstructed clock signal of the data stream. Additionally, the receiver reads data symbols from each elastic buffer by using a receiver clock signal having an average frequency that may differ slightly from the average frequency of the transmit clock signal. Further, the receiver reconstructs the sequence of data symbols from the data symbols read from the elastic buffers.

In these types of communications systems, the transmitter periodically transmits a skip ordered set in each data stream to compensate for the frequency differences between the transmit clock signal, the reconstructed clock signals, and the receiver clock signal. A skip ordered set is an ordered sequence of control symbols that are distinguishable from data symbols in the data stream. The receiver stores the control symbols of a skip ordered set of a data stream into the elastic buffer containing data symbols of the data stream. Additionally, the receiver selectively adds control symbols to the skip ordered sets to avoid data underflow from occurring in the elastic buffers and selectively deletes control symbols from the skip ordered sets to prevent data overflow from occurring in the elastic buffers. In this way, the receiver compensates for the frequency differences between the transmit clock signal, the reconstructed clock signals, and the receiver clock signal.

Additionally, the receiver includes deskew buffers for aligning the data symbols in the elastic buffers. The data symbols may be misaligned from each other because of different propagation delays in the receiver (e.g., static skew). For example, signal traces in the receiver may have different lengths and impedances which affect propagation delays of the data streams and data symbols written into the elastic buffers. Additionally, data symbols may be misaligned in the elastic buffers as result of the receiver adding control symbols to skip ordered sets and deleting symbols from skip ordered sets (e.g., dynamic skew). Each of the deskew buffers is capable of storing a number of data symbols of a data stream in addition to a maximum number of control symbols allowed in a skip ordered set of the data stream. In applications in which the receiver receives many data streams from the transmitter, the deskew buffers may consume a considerable amount of power and occupy a considerable amount of area in the receiver. For example, the deskew buffers may be implemented in an integrated circuit and may consume a considerable amount of power and occupy a considerable amount of area in the integrated circuit.

In light of the above, a need exists for an improved communication system for transmitting data through multiple data lanes. A further need exists for reducing the size and power consumption of deskew buffers for deskewing data symbols in a receiver.

SUMMARY

In various embodiments, a communication system includes a transmitter that converts a data stream into multiple data streams and transmits the multiple data streams to a receiver through multiple data lanes. Additionally, the transmitter periodically transmits a skip ordered set in each of the data stream. Each skip ordered set includes a number of symbols. The receiver receives the data streams from the transmitter and stores the data streams into a compensation module. Further, the receiver may add one or more symbols to a skip ordered set or delete one or more symbols from a skip ordered set to prevent data underflow or data overflow from occurring in the compensation module. In this way, the compensation module compensates for differences in data rates of the data streams received at the receiver. Additionally, the receiver generates minimal skip ordered sets by selectively deleting one or more symbols in the skip ordered sets of the data streams received by the receiver such that each minimal skip ordered set has a same predetermined number of symbols. The receiver stores the minimal skip ordered sets as well other symbols of the data streams into a deskew module and aligns the symbols in the deskew module based on the minimal skip ordered sets.

In various embodiments, the receiver stores the minimal skip ordered sets into data buffers of the deskew module. Because the skip ordered sets of the data streams are reduced to minimal skip ordered sets, the size of the data buffers in the deskew module is also reduced. Further, because the minimal skip ordered sets have the same predetermined number of symbols, control circuitry for aligning symbols in deskew module is simplified, which further reduces the size of the deskew module. Moreover, because the minimal skip ordered sets have the same predetermined number of symbols, the control circuitry may determine a priori a clock cycle of a clock signal of the receiver in which data symbols will be aligned at heads of the data buffers in the deskew module. As a result, the control circuitry may have multiple clock cycles of the clock signal in the receiver to determine when data symbols will be aligned at the heads of the data buffers in the deskew module. Because the speed of the control circuitry often includes a critical timing path that limits the frequency of the clock signal in the receiver, the frequency of the clock signal in the receiver may be increased as a result of the control circuitry having multiple clock signals to determine when data symbols will be aligned at the heads of the data buffers in the deskew module. Moreover, increasing the frequency of the clock signal in the receiver allows the receiver to receive data streams at higher data rates, which increases the communication rate of the communication system.

A system, in accordance with an embodiment of the present invention, includes a compensation module and a deskew module coupled to the compensation module. The compensation module is configured to receive data streams each having a data rate and including symbols. The symbols in each of the data streams includes data symbols and a skip ordered set comprising a number of symbols. Further, the compensation module is configured to selectively modify the number of symbols in the skip ordered sets of the data streams to compensate for differences in the data rates of the data streams. The deskew module is configured to generate minimal skip ordered sets each having a same predetermined number of symbols by selectively deleting at least one symbol in the skip ordered sets. The deskew module is further configured to align data symbols across the data streams based on the minimal skip ordered sets.

An apparatus, in accordance with an embodiment of the present invention, aligns data symbols in data streams. Each of the data streams has a data rate and includes symbols. The symbols in each of the data streams include data symbols and a skip ordered set comprising a number of symbols. The apparatus includes data buffers and a controller coupled to the data buffers. Each of the data buffers is configured to store symbols of the data streams. The controller is configured to generate minimal skip ordered sets each having a same predetermined number of symbols by selectively deleting at least one symbol in the skip ordered sets of the data streams without storing a deleted symbol into the plurality of data buffers. The controller is further configured to align data symbols of the data streams stored in the data buffers based on the minimal skip ordered sets.

A method, in accordance with an embodiment of the present invention, aligns data symbols in data streams each having a data rate and including symbols. The symbols in each of the data streams include data symbols and a skip ordered set including a number of symbols. The method includes generating minimal skip ordered sets each having a same predetermined number of symbols by selectively deleting at least one symbol in the skip ordered sets of the data streams. The method also includes aligning data symbols of the data streams based on the minimal skip ordered sets. In a further embodiment, aligning the data symbols of the streams includes selectively adding at least one symbol to the minimal skip ordered sets. In still a further embodiment, the method includes generating an output stream by collating data symbols of the data streams.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a communication system includes a transmitter that transmits multiple data streams each including symbols to a receiver in the communication system. The symbols in each of the data streams includes data symbols and a skip ordered set comprising a number of symbols. The receiver selectively modifies the number of symbols in the skip ordered sets to compensate for differences between a transmit data rate of the transmitter and a receive data rate of the receiver as well as differences in data rates of the data streams received by the receiver. Additionally, the receiver generates minimal skip ordered sets, each of which has a same predetermined number of symbols, based on the skip ordered sets in the data streams. Further, the receiver stores symbols of the data streams and symbols of the minimal skip ordered sets into data buffers, and aligns data symbols of the data streams stored in the data buffers based on the minimal skip ordered sets.

Because the data buffers store minimal skip ordered sets instead of the original skip ordered sets in the data streams, the required size of the data buffers is reduced. Further, because each of the minimal skip ordered sets includes a same predetermined number of symbols, control circuitry in the receiver for aligning the data symbols in the data buffers may determine a priori a clock cycle of a clock signal in the receiver in which the data symbols will be aligned in the data buffers. Because the control circuitry has multiple clock cycles of the clock signal in the receiver to determine when symbols will be aligned in the data buffers, the frequency of the clock signal in the receiver may be increased. Moreover, increasing the frequency of the clock signal in the receiver allows the receiver to receive data streams at higher data rates, which increases the communication rate of the communication system.

Figure 1:
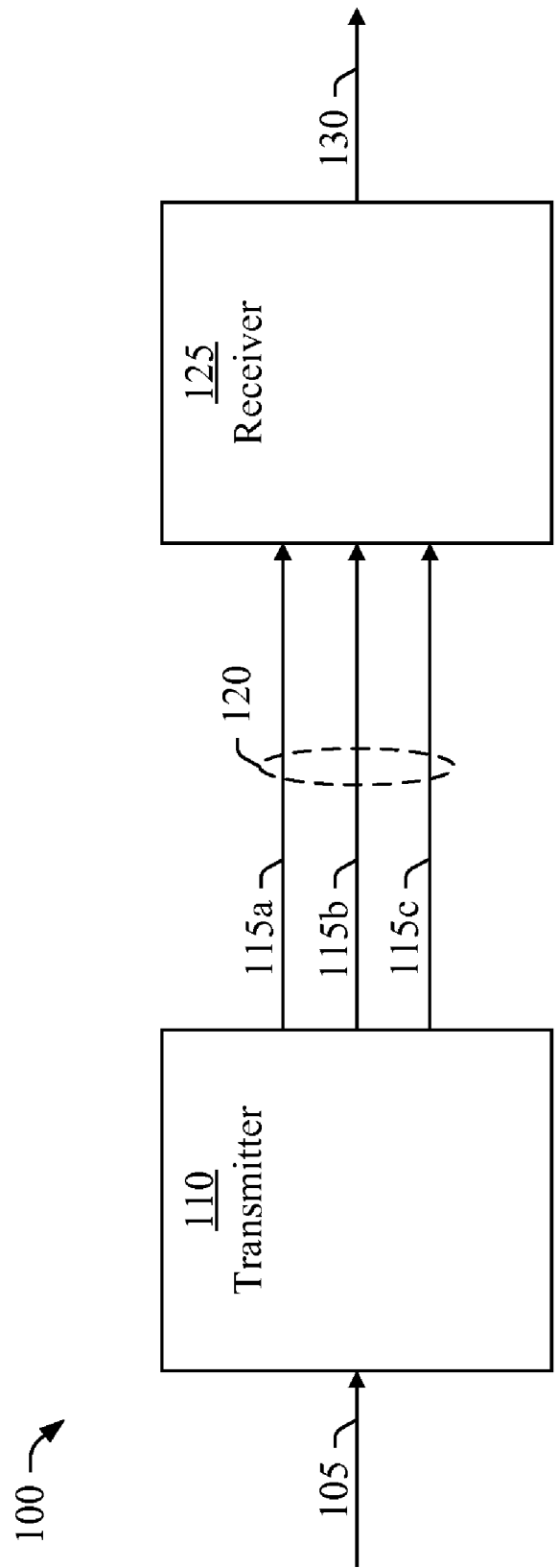
FIG. 1 is a block diagram of a communication system, in accordance with an embodiment of the present invention.

FIG. 1 illustrates a communication system 100, in accordance with an embodiment of the present invention. The communication system 100 includes a transmitter 110 and a receiver 125. The transmitter 110 is coupled (e.g., connected) to the receiver 125 via multiple data lanes 120 (e.g., data lanes 120a-c). The transmitter 110 receives a data stream 105, converts (e.g., serializes) the data stream 105 into multiple data streams 115 (e.g., serial data streams), and transmits the multiple data streams 115 via corresponding data lanes 120 to the receiver 125. The receiver 125 converts the data streams 115 received from the transmitter 110 through the data lanes 120 into symbols (e.g., deserializes the data streams 115), generates a data stream 130 representing the data stream 105 (e.g., the original data stream), and outputs the data stream 130. In this way, the receiver 125 reconstructs the data stream 105 from the data streams 115 received through the data lanes 120. Although three data lanes 120 are illustrated in FIG. 1, the communication system 100 may have more or fewer than three data lanes 120 in other embodiments.

In various embodiments, the transmitter 110 transmits the data streams 115 through the data lanes 120 by distributing data symbols in the data stream 105 among the data streams 115. Because the data lanes 120 may have different electrical properties, the rates of the data streams 115 received by the receiver 125 through the data lanes 120 may vary. For example, the propagation delays of the data streams 115 may vary because of different physical characteristics of the data lanes 120, such as the lengths and impedances of the data lanes 120. The receiver 125 aligns the data symbols of the data streams 115 by compensating for the different data rates of the data streams 115 and generates the sequence of symbols 130 based on the aligned data symbols. In this way, the data stream 130 includes the same data symbols as the data stream 105 (e.g., the original data stream).

In some embodiments, the data lanes 120 are part of a serial data link. For example, the serial link may be a PCI-Express™ bus or a wireless communication link. In these embodiments, the transmitter 110 generates the data streams 115 by converting (e.g., serializing) symbols of the data stream 105 and transmits the data streams 115 serially through the data lanes 120 to the receiver 125. In turn, the receiver 125 converts (e.g., deserializes) the data streams 115 into symbols and aligns the symbols. In some embodiments, the transmitter 110 encodes the symbols in the data streams 105 before transmitting the data streams 115 to the receiver 125. For example, the transmitter 110 may encode the symbols in the data stream 105 and generate the data streams 115 by using the encoded symbols. In these embodiments, the receiver 125 decodes the symbols in the data streams 115 received from the transmitter 110. For example, the transmitter 110 may generate the data streams 115 by encoding the symbols in the data stream 105 and serializing the encoded symbols, and the receiver 125 may deserialize the encoded symbols in the data streams 115 and decode the encoded symbols.

In various embodiments, each of the data symbols in the data stream 105 includes eight data bits and the transmitter 110 encodes the data symbols into data symbols having ten bits by using an 8b/10b transmission code. For example, the transmission code may be the 8b/10b transmission code specified in ANSI X3.230-1994, IEEE 802z, or IEEE 36.2.4. In these embodiments, an 8-bit data symbol is divided into three data bits and five data bits that are mapped onto a four-bit code group and a six-bit code group, respectfully. Moreover, the four-bit group code and the six-bit group code together form a 10-bit data symbol in the 8b/10b transmission code. In addition to encoding the 8-bit data symbols into 10-bit data symbols, the 8b/10b transmission code is used to encode control symbols (e.g., special symbols) for controlling transmission of data. For example, the 8b/10b transmission code may include a skip symbol (SKP) and a comma symbol (COM).

In operation, the transmitter 110 periodically inserts a skip ordered set (SKPOS) into each data stream 115 transmitted through the data lanes 120 to the receiver 125. Each skip order set includes one or more control symbols. For example, a skip ordered set may include a comma symbol followed by one or more skip symbols. The receiver 125 aligns the data streams 115 based on the skip ordered sets to compensate for differences in data rates of the data streams 115 received by the receiver 125 as well as frequency differences between a clock signal in the transmitter 110 and a clock signal in the receiver 125. In this process, the receiver 125 selectively deletes and inserts control symbols (e.g., skip symbols) in the skip ordered sets of the data streams 115 to compensate for the different data rates of the data streams 115 received by the receiver 125 and the frequency differences between the clock signals in the transmitter 110 and the receiver 125.

For example, the receiver 125 may delete one or more control symbols (e.g., skip symbols) from a data stream 115 having a faster data rate and insert one or more control symbols (e.g., skip symbols) into a data stream 115 having a slower data rate. In this way, the receiver 125 compensates for differences in the data rates of the data streams 115 received by the receiver 125. As another example, the receiver 125 may delete control symbols from data streams if the clock signal in the transmitter 110 has a higher frequency than the clock signal in the receiver 125 or add control symbols to data streams when the clock signal in the transmitter 110 has a lower frequency than the clock signal in the receiver 125. In this way, the receiver 125 compensates for differences between the frequencies of the clock signal in the transmitter 110 and the clock signal in the receiver 125.

In various embodiments, a skip ordered set includes a comma symbol followed by three skip symbols. In these embodiments, the receiver 125 may delete one or two control symbols (e.g., skip symbols) or insert one or two control symbols (e.g., skip symbols) in one or more of the skip ordered sets to compensate for different data rates of the data streams 115 or frequency differences between the clock signals in the transmitter 110 and the receiver 125. For example, the receiver 125 may insert up to two skip symbols or delete up to two skip symbols in a skip ordered set to compensate for the different data rates of the data stream 115 received by the receiver 125. In this example, a skip ordered set contains a comma symbol followed by a number of skip symbols in the range of one to five.

Additionally, the receiver 125 generates minimal skip ordered sets based on the skip ordered sets in the data streams 115 and aligns the data symbols in the data stream 115 based on the minimal skip ordered sets. The receiver 125 generates the minimal skip ordered sets by selectively deleting one or more symbols in the skip ordered sets of the data streams 115. Each of the minimal skip ordered sets includes a same predetermined number of symbols (e.g., control symbols). In this way, storage requirements in the receiver 125 for storing control symbols of skip ordered sets for aligning data symbols in data streams 115 is reduced. Further, the receiver 125 generates the data stream 130 by selectively adding control symbols to the minimal skip ordered sets, as is described more fully herein. Although the receiver 125 deletes one or more symbols in the skip ordered sets of the data streams 115, the receiver 125 need not delete a symbol from each of those skip ordered sets to generate the minimal skip ordered sets. For example, a skip ordered set in a data stream 115 may have the same number of symbols as the minimal skip ordered set generated from the skip ordered set in the data stream 115, namely the predetermined number of control symbols. Thus, the receiver 125 need not delete a symbol from the skip ordered set in a data stream 115 to generate the minimal skip ordered set.

Because each of the minimal skip ordered sets has the same predetermined number of control symbols, control circuitry in the receiver for aligning the data symbols in the data streams 115 may determine a priori a clock cycle of the receiver 125 is which data symbols of the data streams 115 will be aligned in the receiver 125. As a result, the control circuitry has multiple clock cycles to determine when the data symbols of the data streams 115 will be aligned in the receiver 125, which allows the control circuitry to operate as a higher frequency of the clock signal in the receiver 125. Moreover, because the clock signal of the receiver may operate at a higher frequency, the receiver 125 may receive the data streams 115 at a higher data rate and generate the data stream 130 at a higher data rate. As a result, the communication system 100 may operate at a higher communication rate.

Figure 2:
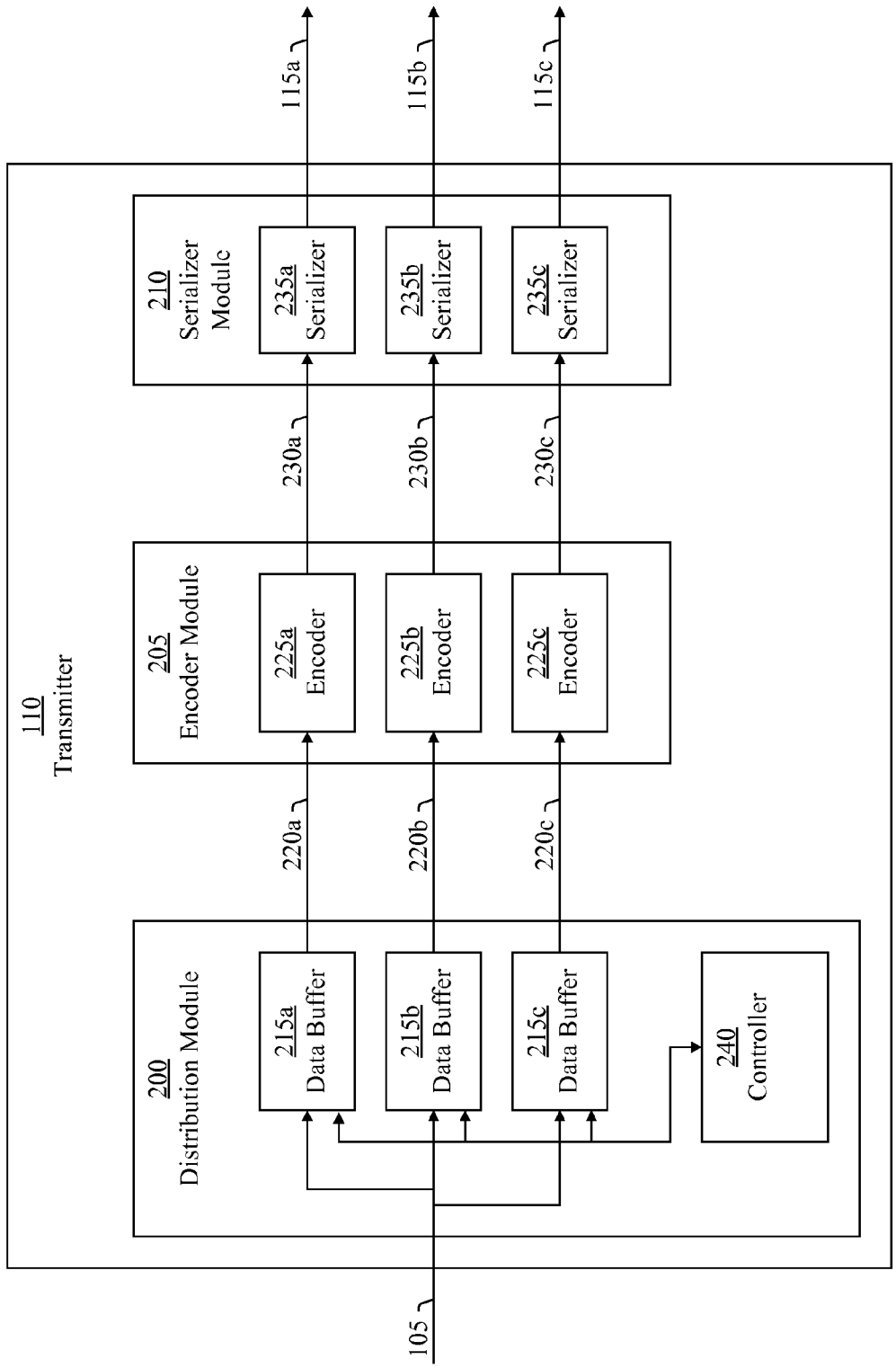
FIG. 2 is a block diagram of a transmitter, in accordance with an embodiment of the present invention.

FIG. 2 illustrates the transmitter 110, in accordance with an embodiment of the present invention. The transmitter 110 includes a distribution module 200, an encoder module 205, and a serializer module 210. The encoder module 205 is coupled to the distribution module 200 and the serializer module 210. The distribution module 200 generates data streams 220 (e.g., data streams 220a-c) by distributing data symbols in the data stream 105 among the data streams 220. For example, the distribution module 200 may stripe data symbols in the data stream 105 among the data streams 220. The encoder module 205 generates data streams 230 (e.g., data streams 230a-c) by encoding the symbols in the data streams 220. The serializer module 210 generates the data streams 115 (e.g., the data streams 115a-c) by serializing the symbols in the data streams 230.

Although the transmitter 110 has been described herein as generating the data streams 220 based on the data stream 105, the data streams 230 based on the data streams 220, and the data streams 115 based on the data streams 230, in various embodiments some or all of the data stream 105, the data streams 220, the data streams 230, and the data streams 115 are considered to be part of the same data stream. In these embodiments, components of the transmitter 110 perform operations or functions on the same data stream. For example, the distribution module 200 may distribute symbols in the data stream 105 among the data streams 220, the encoder module 205 may encode symbols in the data stream 105, and the serializer module 210 may generate the data streams 115 by serializing the encoded data symbols in the data stream 105.

In one embodiment, the distribution module 200 includes data buffers 215 (e.g., data buffers 215a-c) and a controller 240 coupled (e.g., connected) to each of the data buffers 215. The controller 240 controls operation of the distribution module 200. In some embodiments, the controller 240 also controls operation of the encoder module 205 or the serializer module 210, or both. Further, the encoder module 205 includes encoders 225 (e.g., encoders 225a-c) and the serializer module 210 includes serializers 235 (e.g., serializers 235a-c). Each of the encoders 225 is coupled (e.g., connected) to a corresponding data buffer 215 and a corresponding serializer 235. As illustrated in FIG. 2, the encoders 225a-c are coupled to corresponding data buffers 215a-c and corresponding serializers 235a-c. In other embodiments, the distribution module 200 may have more or fewer than three data buffers 215, the encoder module 205 may have more or fewer than three encoders 225, and the serializer module 210 may have more or fewer than three serializers 235.

In operation, the data buffers 215 receive the data stream 105 and the controller 240 distributes data symbols in the data stream 105 among the data buffers 215 by selectively writing the data symbols into the data buffers 215. For example, the controller 240 may stripe the data symbols in the data stream 105 among the data buffers 215. Each of the data buffers 215 generates a data stream 220, which includes the data symbols of the data stream 105 written into the data buffer 215, and provides the data stream 220 to the encoder 225 corresponding to the data buffer 215.

Each of the encoders 225 encodes the symbols in the data stream 220 received from the data buffer 215 corresponding to the encoder 225. In one embodiment, each of the symbols in the data stream 220 is an 8-bit data symbol and each encoder 225 encodes the data symbols in the data stream 220 received from data buffer 215 corresponding to the encoder 225 into 10-bit data symbols. Additionally, the encoder 225 generates a data stream 230, which includes the 10-bit data symbols encoded by the encoder 225, and provides the data stream 230 to the serializer 235 corresponding to the encoder 225. Periodically, the controller 240 simultaneously inserts a skipped order set into each of the data streams 220. For example, the controller 240 my write the skip ordered sets into the data buffers 215. As another example, the controller 240 may write the skip ordered sets into the encoders 225. Each of the skipped ordered sets includes one or more 10-bit control symbols. In various embodiments, each of the skipped ordered sets includes a 10-bit comma symbol followed by three 10-bit skip symbols.

Each of the serializers 235 generates a data stream 115 by serializing the data symbols and the control symbols in the data stream 230 received from the corresponding encoder 225. Further, the serializer module 210 transmits each of the data streams 115 to the receiver 125 through the data lane 120 corresponding to the data stream 115. In some embodiments, the serializer module 210 is optional. In embodiments without the serializer module 210, the transmitter 110 transmits parallel data (e.g., data symbols and control symbols) to the receiver 125 through each of the data lanes 120.

Figure 3:
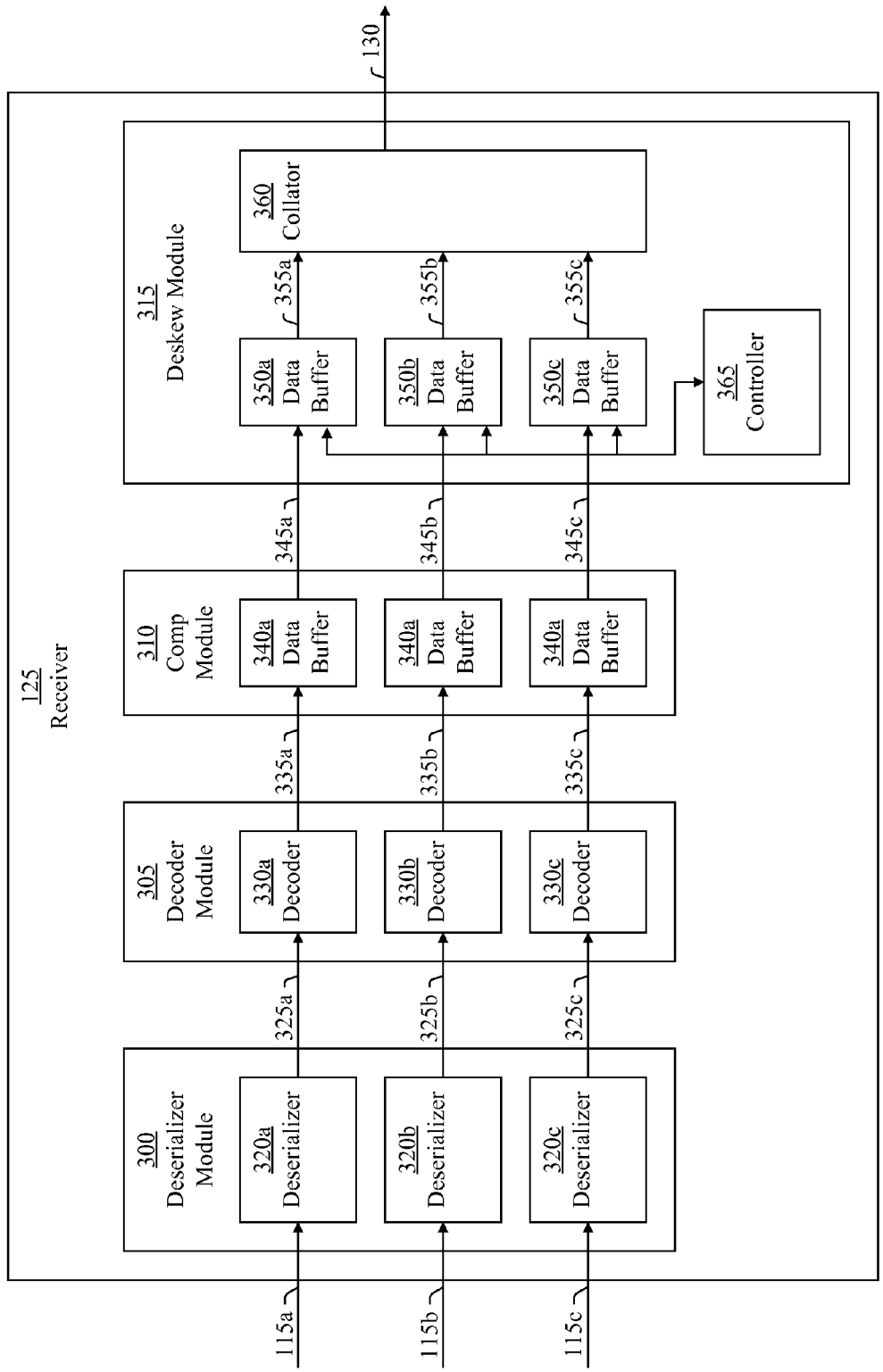
FIG. 3 is a block diagram of receiver, in accordance with an embodiment of the present invention.

FIG. 3 illustrates the receiver 125, in accordance with an embodiment of the present invention. The receiver 125 includes a deserializer module 300, a decoder module 305, a compensation module (Comp Module) 310, and a deskew module 315. The decoder module 305 is coupled (e.g., connected) to the deserializer module 300 and the compensation module 310. Additionally, the compensation module 310 is coupled (e.g., connected) to the deskew module 315. The deserializer module 300 receives the data streams 115 from the transmitter 110 through the data lanes 120 and generates data streams 325 corresponding to the data streams 115 by deserializing symbols (e.g., data symbols and control symbols) in the data streams 115. In this process, the deserializer module 300 reconstructs a clock signal for each data stream 115 based on the symbols (e.g., serial symbols) in the data stream 115. Further, the deserializer module 300 generates the data streams 325 by converting the data streams 115 (e.g., serial data streams) into symbols (e.g., parallel systems) based on the reconstructed clock signals. The symbols in each data stream 325 represent the encoded data symbols of a corresponding data stream 115 as well as encoded control symbols of skip ordered sets generated by the transmitter 110 and inserted into the data stream 115. For example, each data stream 325 may be a sequence of symbols including encoded data symbols and encoded control symbols.

The decoder module 305 receives the data streams 325 from the deserializer module 300 and generates data streams 335 corresponding to the data streams 325 by decoding symbols in the data streams 325. For example, each of the data streams 335 may be a sequence of symbols included decoded data symbols and decoded control symbols. In various embodiments, each of the symbols in the data streams 325 includes ten data bits and the decoder module 305 decodes the symbols in the data stream 325 into symbols having eight bits by using an 8b/10b transmission code. For example, the transmission code may be the 8b/10b transmission code specified in ANSI X3.230-1994, IEEE 802z, or IEEE 36.2.4. In these embodiments, each of the data streams 335 includes data symbols having eight-bits and control symbols having eight bits. Moreover, each of the data streams 335 includes skip ordered sets including control symbols. For example, each of the data streams 335 may include a skip ordered set including a comma symbol followed by three skip symbols. The decoder module 305 provides the data streams 335 to the compensation module 310.

The compensation module 310 generates the data streams 345 by selectively adding control symbols (e.g., skip symbols) to skip ordered sets data streams 335 and selectively deleting control symbols from skip ordered sets in the data streams 335. In this way, the compensation module 310 selectively modifies the number of control symbols in the skip ordered sets of the data streams 345 to compensate for the different data rates at which the receiver 125 receives the data streams 115 as well as frequency differences between the clock signals of the transmitter 110 and the receiver 125. Moreover, the compensation module 310 inhibits data underflow and data overflow from occurring in the receiver 125 because of the different data rates of the data streams 115 received by the receiver 125. For example, the compensation module 310 may add a skip symbol to a skip ordered set of a data stream 345 in which the corresponding data stream 115 has a slower data rate and delete a skip symbol from a skip ordered set of a data stream 345 in which the corresponding data stream 115 has a faster data rate. The compensation module 310 provides the data streams 345 to the deskew module 315. Because the compensation module 310 generates the data streams 345 by individually adding symbols to skip ordered sets in the data streams 335 and individually deleting symbols from the skip ordered sets in the data streams 335, the data symbols following the skip ordered sets in the data streams 345 may not be aligned with each other.

In some embodiments, the compensation module deletes each symbol from a skip ordered set of a data stream 335 and adds another symbol to the corresponding data stream 345. In these embodiments, the added symbol is a minimal skip ordered set in the data stream 345. Moreover, the predetermined number of symbols in each minimal skip ordered sets is one.

In some embodiments, the predetermined number of symbols in each minimal skip ordered set is zero. In these embodiments, the compensation module 310 deletes each symbol from a skip ordered set of a data stream 335 and generates a tag in the corresponding data stream 345 for indicating a location of the minimal skip ordered set in the data buffer 340 corresponding to the data stream 345. Further, the compensation module 310 associates the tag with a data symbol in the data stream 345. In turn, the deskew module 315 stores the tag along with the data symbol in the data buffer 340.

In one embodiment, a tag is a binary value and each location in the data buffer 340 includes a bit for storing a tag along with a data symbol. For example, a tag having a binary value of one stored at a location of a data buffer 340 may indicate a minimal skip ordered set associated with a data symbol stored at that location. Conversely, a tag having a binary value of zero stored at a location of a data buffer 340 may indicate a minimal skip ordered set is not associated with a data symbol stored at that location.

In various embodiments, a minimal skip ordered set includes the tag indicating the location of the minimal skip ordered set. In this way, the symbols of a skip ordered set in a data stream 335 are replaced with a corresponding minimal skip ordered set containing a tag in the corresponding data stream 345. In one embodiment, a tag associated with a data symbol in a data stream 345 indicates that the location of the minimal skip ordered set containing the tag follows the data symbol. In another embodiment, a tag associated with a data symbol in a data stream 345 indicates that the location of the minimal skip ordered set containing the tag precedes the data symbol.

In various embodiment, the compensation module 310 receives each of the data streams 335 based on the reconstructed clock signal of the data stream 335 and provides the data streams 345 to the deskew module 315 based on the clock signal in the receiver 125. In this way, the compensation module 310 synchronizes the reconstructed clock signals with the clock signal in the receiver 125 and synchronizes the data streams 335 with the data streams 345. Moreover, the compensation module 310 modifies the skip ordered sets in the data streams 335 based on the reconstructed clock signals corresponding to the data streams 335. Because the reconstructed clock signals may operate at slightly different frequencies from each other and from the clock signal in the receiver 125, the data symbols of the data streams 345 may be misaligned from each other. The data symbols of the data streams 345 may be further misaligned from each other because of different propagation delays among the data streams 115, different propagation delays among the data streams 325, or different propagation delays among the data streams 335. For example, propagation delays may vary among the data streams 115 because signal traces used transmit the data streams in the receiver 125 have different lengths or impedances.

The deskew module 315 generates the data streams 355 based on the data streams 345. In this process, the deskew module 315 generates minimal skip ordered sets based on the skip ordered sets in the data streams 345 and stores the minimal skip ordered sets as well as data symbols of the data streams 345. Additionally, the deskew module 315 aligns the data symbols stored in the deskew module 315 based on the minimal skip ordered sets. The deskew module 315 generates the minimal skip ordered sets by selectively deleting control symbols from the skip ordered sets in the data streams 345 such that each minimal skip ordered set has the same predetermined number of control symbols. For example, each of the minimal skip ordered sets stored in the deskew module 315 may consist of a single comma symbol followed by a single skip symbol. Because the number of control symbols in the minimal skip ordered sets is less than a maximum specified number of control symbols in the skip ordered sets of the data streams 345, the required size and storage capacity of the deskew module 315 is reduced. Furthermore, because each of the minimal skip ordered sets has the same number of control symbols, control circuitry in the deskew module 315 may have multiple clock cycles of the clock signal in the receiver 125 for aligning data symbols based on the minimal skip ordered sets, as is described more fully herein.

In one embodiment, the deskew module 315 outputs two symbols of each data stream 355 in a single clock cycle. For example, the deskew module 315 may output one symbol of each data stream 355 on an edge of the clock signal in the receiver 125 and output the next symbol of each data stream 355 on the next edge of the clock signal. In this way, the receiver 125 may operate at a higher communication rate by receiving the data streams 115 from the data lanes 120 at a higher data rate (e.g., twice the data rate). In various embodiments, the receiver 125 includes a physical media access sublayer (PMA), a physical coding sublayer (PCS), and a media access control (MAC). In this embodiment, the physical media access layer includes the deserializer module 300, the physical coding sublayer includes the decoder module 305 and the compensation module 310, and the media access control includes the deskew module 315.

In various embodiments, the deserializer module 300 includes deserializers 320 (e.g., deserializers 320*a-c*), the decoder module 305 includes decoders 330 (e.g., decoders 330*a-c*), the compensation module 310 includes data buffers 340 (e.g., data buffers 340*a-c*), and the deskew module 315 includes data buffers 350 (e.g., data buffers 350*a-c*). Each of the decoders 330 corresponds to a deserializer 320 and to a data buffer 340. Further, each of the data buffers 340 corresponds to a data buffer 350. In these embodiments, each deserializer 320 receives a corresponding data stream 115 from the transmitter 110 through a corresponding data lane 120 and generates a corresponding data stream 325 by deserializing symbols in the data stream 115. In this process, the deserializer module 300 reconstructs a clock signal for each data stream 115 based on the symbols in the data stream 115. Further, each deserializer 320 generates a data stream 325 by converting the data stream 115 (e.g., serial data) received by the deserializer 320 into symbols (e.g., parallel data) based on the reconstructed clock signal of the data stream 115. The symbols in each of the data streams 325 include encoded data symbols of the data stream 115 as well as encoded control symbols of skip ordered sets in the data stream 115. For example, each of the data streams 325 may be a sequence of symbols including encoded data symbols and encoded control symbols.

Each of the decoders 330 receives a data stream 325 from the deserializer 320 corresponding to the decoder 330 and generates a data stream 335 corresponding to the data stream 325 by decoding the symbols (e.g., the encoded data symbols and encoded control symbols) in the data stream 325. In various embodiments, the symbols in the data streams 325 are 10-bit data symbols and the symbols in the data streams 335 are 8-bit symbols. In some embodiments, each of the symbols in the data steams 335 further includes a data bit indicating whether symbol is a data symbol or a control symbol. In these embodiments, each symbol in the data stream 335 has at least nine bits. In some embodiments, each of the symbols in the data stream 335 includes a data bit indicating whether the symbol is valid (e.g., contains valid data). In these embodiments, each symbol in the data stream 335 has at least nine bits. In these embodiments, each symbol in the data stream 335 has at least nine bits. In some embodiments, each of the symbols in the data stream 335 includes a data bit indicating whether the symbol is a data symbol or a control symbol and a data bit indicating whether the symbol is valid. In these embodiments, each symbol in the data stream 335 has at least ten bits. In some embodiments, each of the symbols in the data stream 335 includes a bit indicating whether a minimal skip ordered set is associated with the symbol, as is described more fully herein.

Each of the data buffers 340 in the compensation module 310 receives a data stream 335 from the decoder 330 corresponding to the data buffer 340 and the compensation module 310 generates the data streams 345 corresponding to the data streams 335 by selectively modifying symbols (e.g., control symbols) in the skip ordered of the data streams 335. Further, the compensation module stores the data symbols of each data stream 335 and the resulting skip ordered set of the data stream 335 into the data buffer 340 (e.g., a compensation buffer) corresponding to the data stream 335. In this way, the compensation module 310 prevents data underflow and data overflow from occurring in the data buffers 340. In various embodiments, the compensation module 310 selectively modifies the skip ordered sets in the data stream 335 by selectively adding one or more symbols (e.g., control symbols) to the skip ordered set in the data stream 335 or selectively deleting one or more symbols from the skip ordered set in the data streams 335.

By selectively modifying the number of symbols in the skip ordered sets of the data stream 335 to prevent data underflow or data underflow from occurring in the data buffers 340, the compensation buffer 310 compensates for the different data rates of the data streams 115 received by the receiver 125. For example, the compensation module 310 may add a skip symbol to a skip ordered set of a data stream 335 having a slower data rate and delete a skip symbol from a skip ordered set of a data stream 335 having a faster data rate. Because the compensation module 310 generates the data streams 345 by individually adding symbols to, or deleting symbols from, skip ordered sets in the data streams 335, the data symbols following the skip ordered sets in the data streams 345 may not be aligned with each other.

In addition to the data buffers 350, the deskew module 315 includes a collator 360 and a controller 365, each of which is coupled (e.g., connected) to the data buffers 350. Each of the data buffers 350 in the deskew module 315 receives a data stream 345 from the data buffer 340 corresponding to the data buffer 350 and the controller 365 generates a data stream 355 corresponding to the data stream 345 by generating a minimal skip ordered set based on the skip ordered set in the data stream 345. Further, the controller 365 stores the data symbols of the data stream 345 and the symbols of the minimal skip ordered set generated from the data stream 345 into the data buffer 350 (e.g., a deskew buffer) corresponding to the data stream 345. In this process, the controller 365 identifies the skip ordered set in the data stream 345, generates the minimal skip ordered set based on the skip ordered set in the data stream 345, and writes the minimal skip ordered set into the data buffer 350. The minimal skip ordered set includes a predetermined number of symbols, which may include one or more control symbols in the identified skip ordered set.

In various embodiments, the controller 365 generates a minimal skip ordered set based on an identified skip ordered set by selectively deleting one or more control symbols from the identified skip ordered set. Moreover, each of the minimal skip ordered sets has a same predetermined number of control symbols. In some cases, the minimal skip ordered set is the same as the identified skip ordered set. In these cases, the identified skip ordered set has the same number of symbols as the predetermined number of symbols in the minimal skip ordered set. By storing the minimal skip ordered sets instead of the skip ordered sets identified in the data streams 345, the size and storage capacity requirements of the data buffers 350 is reduced, which also decreases power consumption in the deskew module 315.

In various embodiments, a minimal skip ordered set is a sequence of two symbols (e.g., two control symbols). For example, a minimal skip ordered set may be a comma symbol followed by a skip symbol. In some embodiments, the controller 365 writes a minimal skip ordered set into a data buffer 350 by writing the first two symbols of an identified skip ordered set into the data buffer 350 and discarding any remaining symbols of the identified skip ordered set. In other embodiments, the controller 365 generates the minimal skip ordered set, stores the minimal skip ordered set into the data buffer 350, and discards the identified skip ordered set.

In various embodiments, a minimal skip ordered set is single symbol (e.g., a single control symbol). For example, a minimal skip ordered set may be a comma symbol. In some embodiments, the controller 365 writes a minimal skip ordered set into a data buffer 350 by writing the first symbol of an identified skip ordered set into the data buffer 350 and discarding any remaining symbols of the identified skip ordered set. In other embodiments, the controller 365 generates the minimal skip ordered set, stores the minimal skip ordered set into the data buffer 350, and discards the identified skip ordered set.

In addition to generating minimal skip ordered sets and storing the minimal skip ordered sets into the data buffers 350 along with data symbols in the data streams 345, the controller 365 aligns data symbols in the data buffers 350 based on symbols of the minimal skip ordered sets stored in the data buffers 350. In this process, the controller 365 identifies a skip ordered set first to reach a head of a data buffer 350 in a first clock cycle of the clock signal in the receiver 125 and determines a priori the subsequent clock cycle of the clock signal in which a data symbol will be at the head of the data buffer 350. For example, if the data buffer 350 outputs a symbol in each clock cycle of the clock signal in the receiver 125 and the minimal skip ordered set includes two symbols, the controller 365 determines that a data symbol will be at the head of the data buffer 350 in the second subsequent clock signal following the clock cycle in which the skip ordered set reaches the head of the data buffer 350. Further, the data buffer 350 outputs the first symbol of the minimal skip ordered set to the collator 360 in the next clock cycle and outputs the second symbol of the minimal skip ordered set in the next clock cycle.

Additionally, the controller 365 identifies a skip ordered set last to reach the head of a data buffer 350 in a clock cycle of the clock signal in the receiver 125 and determines a priori the subsequent clock cycle of the clock signal in which a data symbol will be at the head of the data buffer 350. Because the data symbols will be aligned across the data buffers 350 when this skip ordered set reaches the head of the data buffer 350, the controller 365 also determines a priori when data symbols will be aligned at the heads of the data buffers 350. Further, the data buffer 350 outputs the first symbol of minimal skip ordered set in the next clock cycle and the second symbol of the minimal skip ordered set in the next clock cycle. The data buffers 350 then output the data symbols aligned at the heads of the data buffers 350 to the collator 360 in the next clock cycle.

In the clock cycles in which a first data buffer 350 has a data symbol at the head of the first data buffer 350 but a second data buffer 350 has a symbol of a skip ordered set at the head of the second data buffer 350, the controller 365 controls operation of the first data buffer 350 such that the first data buffer 350 does not output the data symbol at the head of the first data buffer 350. Because the first data buffer 350 receives a data symbol at the tail of the data buffer 350 during each of the clock cycles, the number of symbols in the first data buffer 350 increases (e.g., the data buffer 350 expands). Further, in each of these clock cycles, the controller 365 adds a symbol (e.g., a skip symbol) to the minimal skip ordered set output from the first data buffer 350 to the collator 360 by writing the symbol into the collator 360. In this way, the controller 365 expands the minimal skip ordered set. Because the controller 365 adds the symbol to the minimal skip ordered set, the first data buffer 350 need not hold the last symbol of the minimal skip ordered set at the head of the first data buffer 350 and provide the last symbol to the collator 360 in each of these clock cycles. As a result, the size and storage capacity requirements of the data buffer 350 are reduced. Moreover, the collator 360 generates the data stream 130 to include the expanded skip ordered sets. In turn, a device receiving the data stream 130 from the receiver 125 may identify the expanded skip ordered sets in the data stream 130 and use the expanded skip ordered sets to identify data symbols from the data stream 130. Moreover, from the perspective of the device, the data stream 130 is a properly formatted data stream including data symbols and skip ordered sets.

In various embodiments, the controller 365 adds a symbol to a minimal skip ordered set output from the first data buffer 350 by providing a control signal to the collator 360 and the collator 360 appends the symbol to the minimal skip ordered set. In some embodiments, the collator 360 generates the data stream 130 by outputting symbols received from the data buffers 350 without storing the symbols. In these embodiments, the collator 360 appends a symbol to a minimal skip ordered set based on a control signal received from the controller 365 by outputting the symbol in response to receiving the control signal. In this way, the collator 360 need not store the symbols appended to the minimal skip ordered set.

In various embodiments, each of the data buffers 350 may store a number of symbols up to one more a maximum specified difference between the numbers of symbols in two skip ordered sets in the data streams 345. For example, the maximum specified difference between any two skip ordered sets in the data streams 345 may be two and the data buffer 350 may store up to three symbols. As another example, the maximum specified difference between any two skip ordered sets in the data streams 345 may be four and the data buffer 350 may store up to five symbols.

The collator 360 generates the data stream 130 by collating the symbols received from the data buffers 350 and the controller 365 to reconstruct the data stream 105. For example, the collator 360 may interleave the symbols received from the data buffers 350 and the controller 365. In various embodiments, the collator 360 stores symbols received from the data buffers 350 and the controller 365. Further, the collator 360 generates the data stream 105 by collating the stored data symbols.

For example, the collator 360 may receive a symbol corresponding to each data buffer 350 in a clock cycle of the receiver 125 by receiving the symbol from the corresponding data buffer 350 or the controller 365, store the symbols, and add the symbols to the data stream 130 in a subsequent clock cycle of the receiver 125 by interleaving and outputting the symbols stored in the collator 360. As another example, the collator 360 may receive a symbol corresponding to each data buffer 350 at a first edge (e.g., a rising edge) of a clock cycle in the receiver 125 by receiving the symbol from the corresponding data buffer 350 or the controller 365, store the symbols, and add the symbols to the data stream 130 in second edge (e.g., a falling edge) of the clock cycle in the receiver 125 by interleaving and outputting the symbols stored in the collator 360.

In one embodiment, the controller 365 writes a skip symbol to the collator 360 to add the skip symbol to the minimal skip ordered set output from the first data buffer 350 to the collator 360. In another embodiment, the controller 365 provides a control signal to the collator 360 for adding a skip symbol to the minimal skip ordered set and the collator 360 inserts the skip symbol into the minimal skip ordered set based on the control signal. For example, the collator 360 may store symbols received from the data buffers 350 and add the symbols stored in the collator 360 to the data stream 130 by collating the stored data symbols. In this example, the collator 360 stores a skip symbol after outputting the skip symbol and outputs the stored skip symbol more than once based on the control signal received from the controller 365. In this way, the controller 365 adds the stored skip symbol to a minimal skip ordered set by providing the control signal to the collator 360 and the collator 360 inserts the skip symbol into the minimal skip ordered set based on the control signal. Moreover, the collator 360 generates an expanded skip ordered set, which includes the minimal skip ordered set and the skip symbol inserted into the minimal skip order set, and outputs the expanded skip ordered set in the data stream 130. In this way, a device receiving the data stream 130 from the receiver 125 may identify the expanded skip ordered set and use the expanded skip ordered sets to identify data symbols from the data stream 130. Moreover, from the perspective of the device, the data stream 130 is a properly formatted data stream including data symbols and skip ordered sets.

Although the receiver 125 has been described herein as generating the data streams 325 based on the data streams 115, the data streams 335 based on the data streams 325, the data streams 345 based on the data streams 335, the data streams 355 based on the data streams 335, and the data stream 130 based on the data streams 355, in various embodiments some or all of the data streams 115, the data streams 325, the data streams 335, the data streams 345, the data streams 335, and the data stream 130 are considered to be part of the same data stream. In these embodiments, components of the receiver 125 perform operations or functions on the same data stream. For example, the deserializer module 300 may deserialize symbols in the data streams 115, the decoder module 305 may decode symbols in the data streams 115, and the compensation module 310 may modify the number of symbols in skip ordered sets of the data streams 115 to compensate for different data rates of the data streams 115. Further, the deskew module 315 may generate minimal skip ordered sets based on the skip ordered sets in the data streams 115, align data symbols in the data streams 115 based on the minimal skip ordered sets, selectively add symbols to the minimal skip ordered sets during alignment of the data symbols, collate symbols in the data streams 115, and output the data streams 115 as the data stream 130.

Figure 4A:
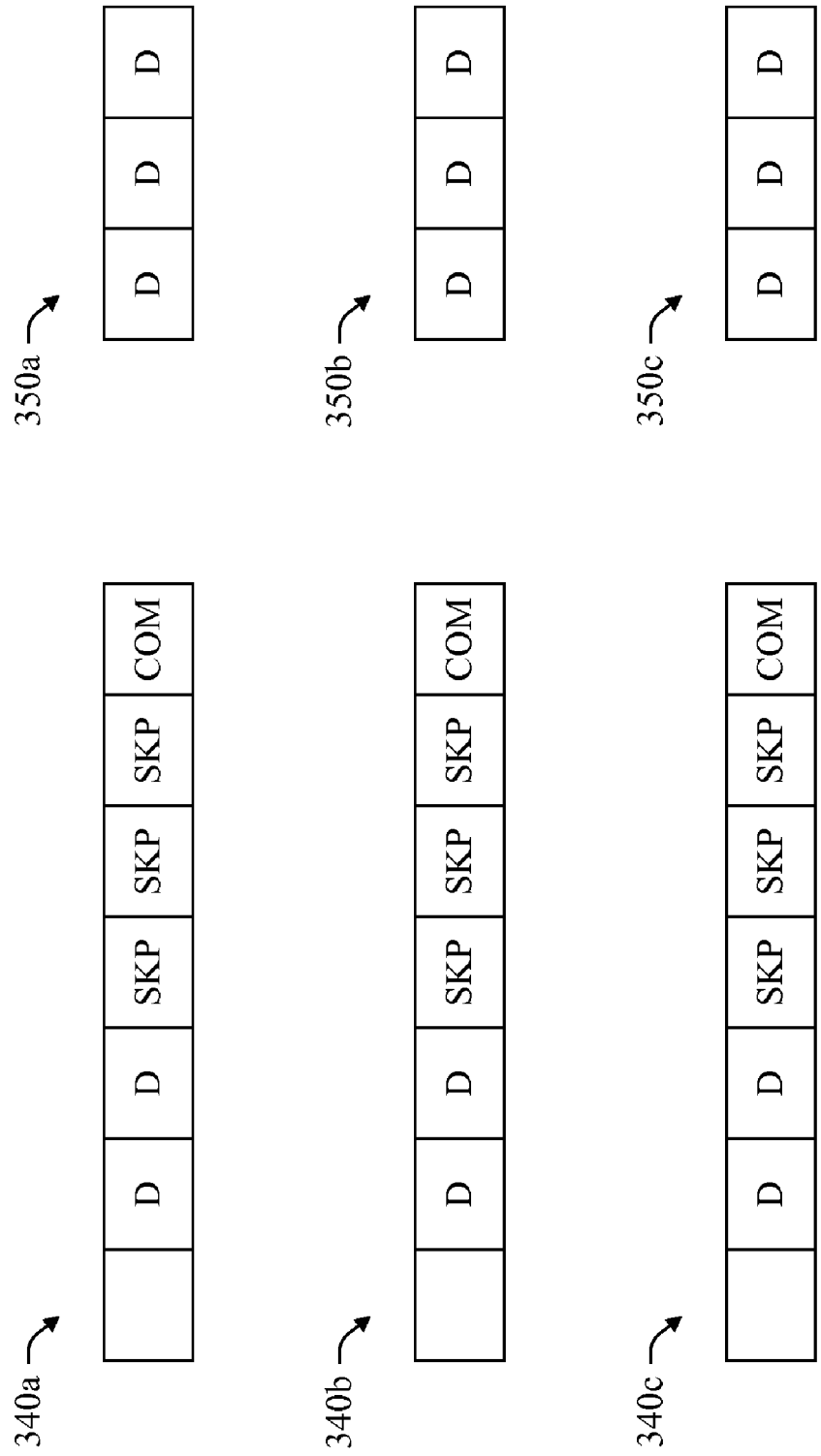
FIGS. 4a-g are block diagrams of data buffers in a receiver, in accordance with an embodiment of the present invention.

FIGS. 4a-g illustrate data buffers in the receiver 125, in accordance with an embodiment of the present invention. As illustrated in FIG. 4a, the data buffers 340 of the compensation module 310 contain symbols of exemplary data streams 335 and the data buffers 350 of the deskew module 315 contain symbols of exemplary data streams 345. Each of the data buffers 340 contains six symbols of the data stream 345 corresponding to the data buffer 340 and each of the data buffers 350 contains three symbols of the data stream 345 corresponding to the data buffer 350. In other embodiments, each of the data buffers 340 may contain more or fewer than six symbols and each of the data buffers 350 may contain more or fewer than three symbols.

As illustrated in FIG. 4a, each of the data buffers 340 (e.g., each of the data buffers 340a-c) includes a comma symbol (COM), followed by three skip symbols (SKP), followed by two data symbols (D). Moreover, the comma symbol in each of the data buffers 340 is at the head of the data buffer 340 and a data symbol in each of the data buffers 340 is at the tail of the data buffer 340. Further, each of the data buffers 340 has capacity to store an additional symbol without data overflow occurring in the data buffer 340 (e.g., the data buffers 340 are not full to capacity). For example, an additional symbol may be added to the tail of each of the data buffers 340. Each of the data buffers 350 contains three data symbols, which includes a data symbol at the head of the data buffer 350 and another data symbol at the tail of the data buffer 350. As illustrated in FIG. 4a, each of the data buffers 350 does not have capacity to store an additional symbol without removing (e.g., outputting) a symbol already contained in the data buffer 350 (e.g., the data buffer 350 is full to capacity). In various embodiments, the receiver 125 initializes the data buffers 350 such that each of the data buffers 350 contains data symbols but does not have capacity to store another data symbol, for example by performing a training session.

Figure 4B:
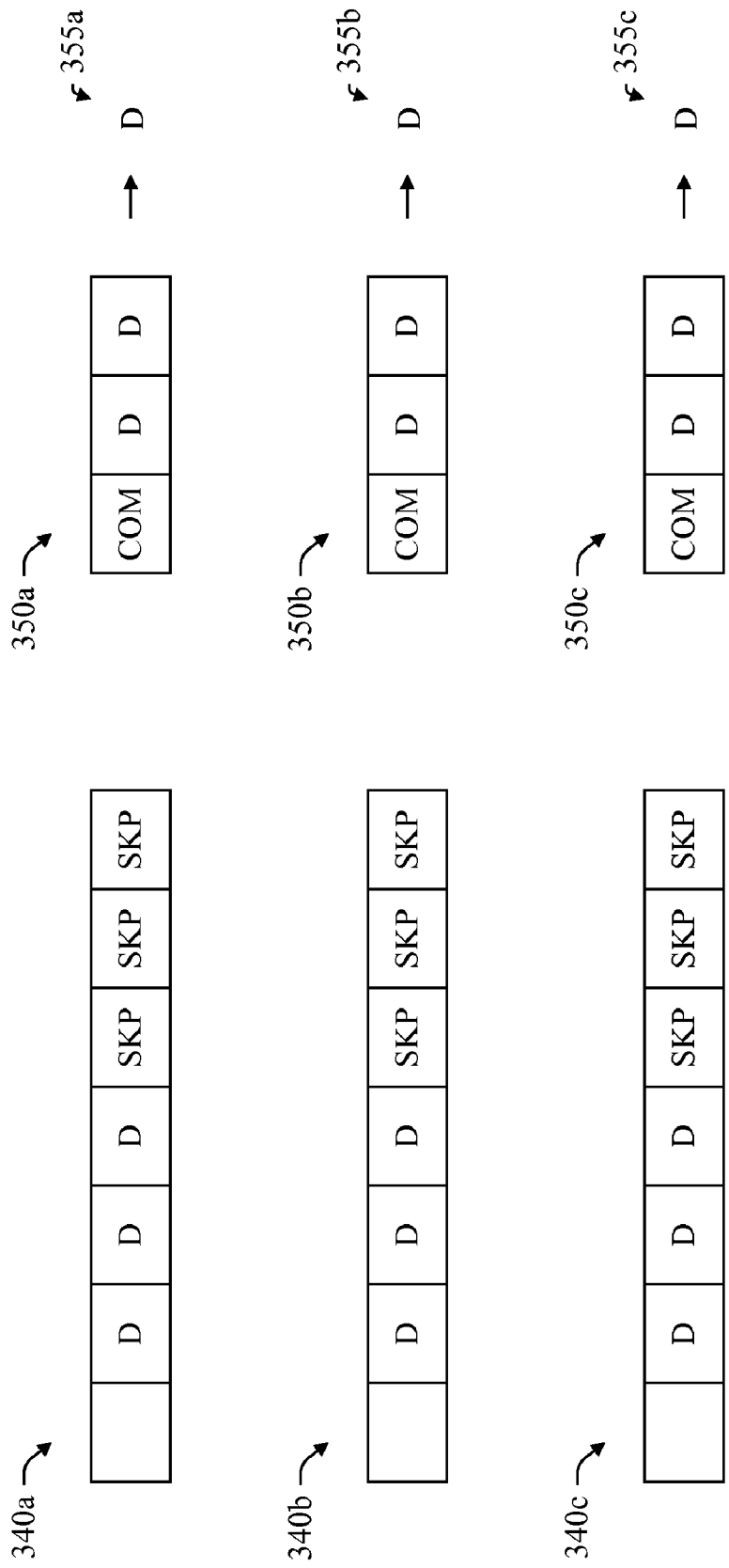

FIG. 4b illustrates the data buffers 340 and the data buffers 350 in the next clock cycle of the clock signal in the receiver 125. As may be envisioned from FIGS. 4a and 4b, each of the data buffers 350 has output a data symbol from the head of the data buffer 350 and each of the data buffers 340 has output a comma symbol from the head of the data buffer 340. Additionally, each of the data buffers 350 has received a comma symbol of the corresponding data stream 345 output from the head of the corresponding data buffer 340 and has stored the comma symbol at the tail of the data buffer 350. Further, each of the data buffers 340 has received a data symbol of the corresponding data stream 335 and has stored the data symbol at the tail of the data buffer 340.

Figure 4C:
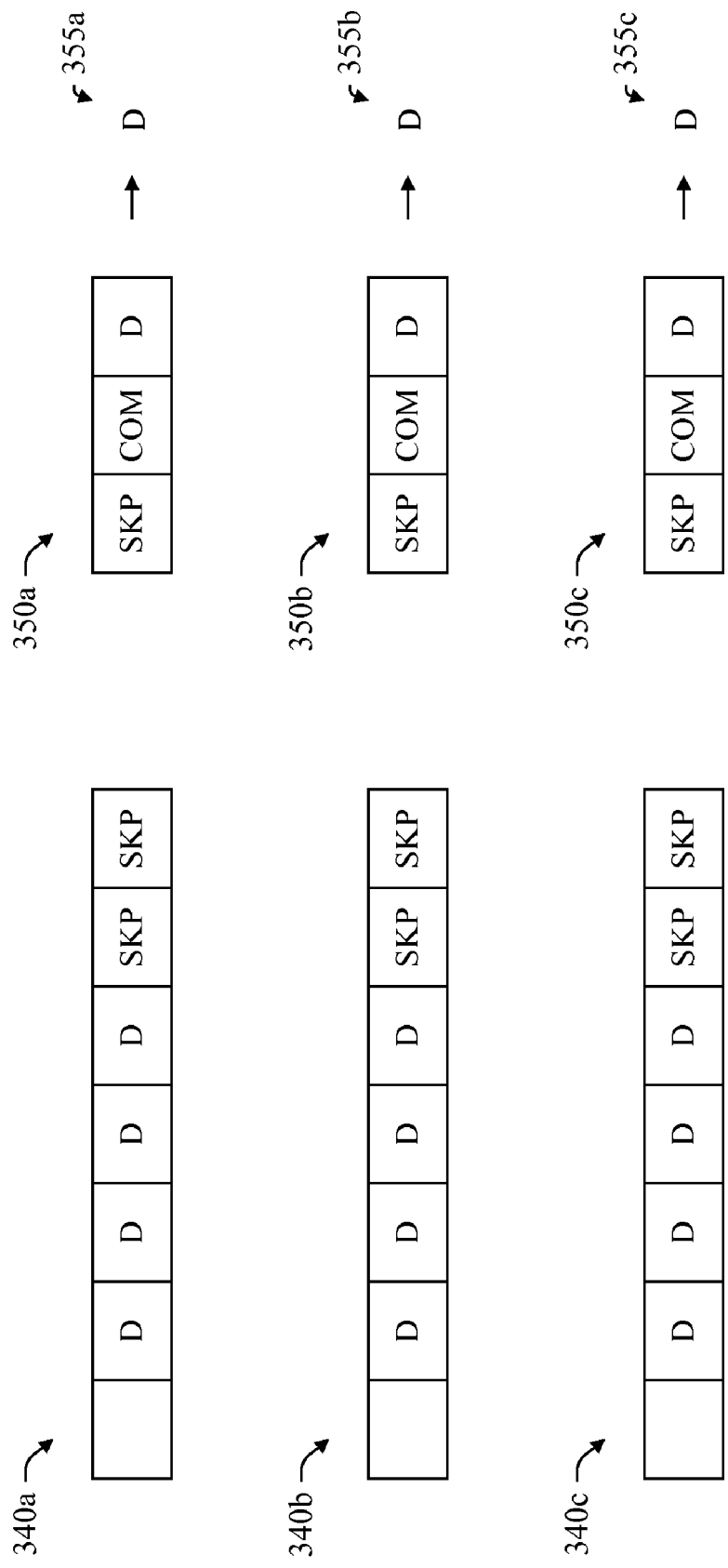

FIG. 4c illustrates the data buffers 340 and the data buffers 350 in the next clock cycle of the clock signal in the receiver 125. As may be envisioned from FIGS. 4b and 4c, each of the data buffers 350 has output a data symbol from the head of the data buffer 350 and each of the data buffers 340 has output a skip symbol from the head of the data buffer 340. Additionally, each of the data buffers 350 has received a skip symbol of the corresponding data stream 345 output from the head of the corresponding data buffer 340 and has stored the skip symbol at the tail of the data buffer 350. Further, each of the data buffers 340 has received a data symbol of the corresponding data stream 335 and has stored the data symbol at the tail of the data buffer 340. As illustrated in FIG. 4c, each of the data buffers 350 contains a minimal skip ordered set containing a comma symbol followed by a skip symbol.

Figure 4D:
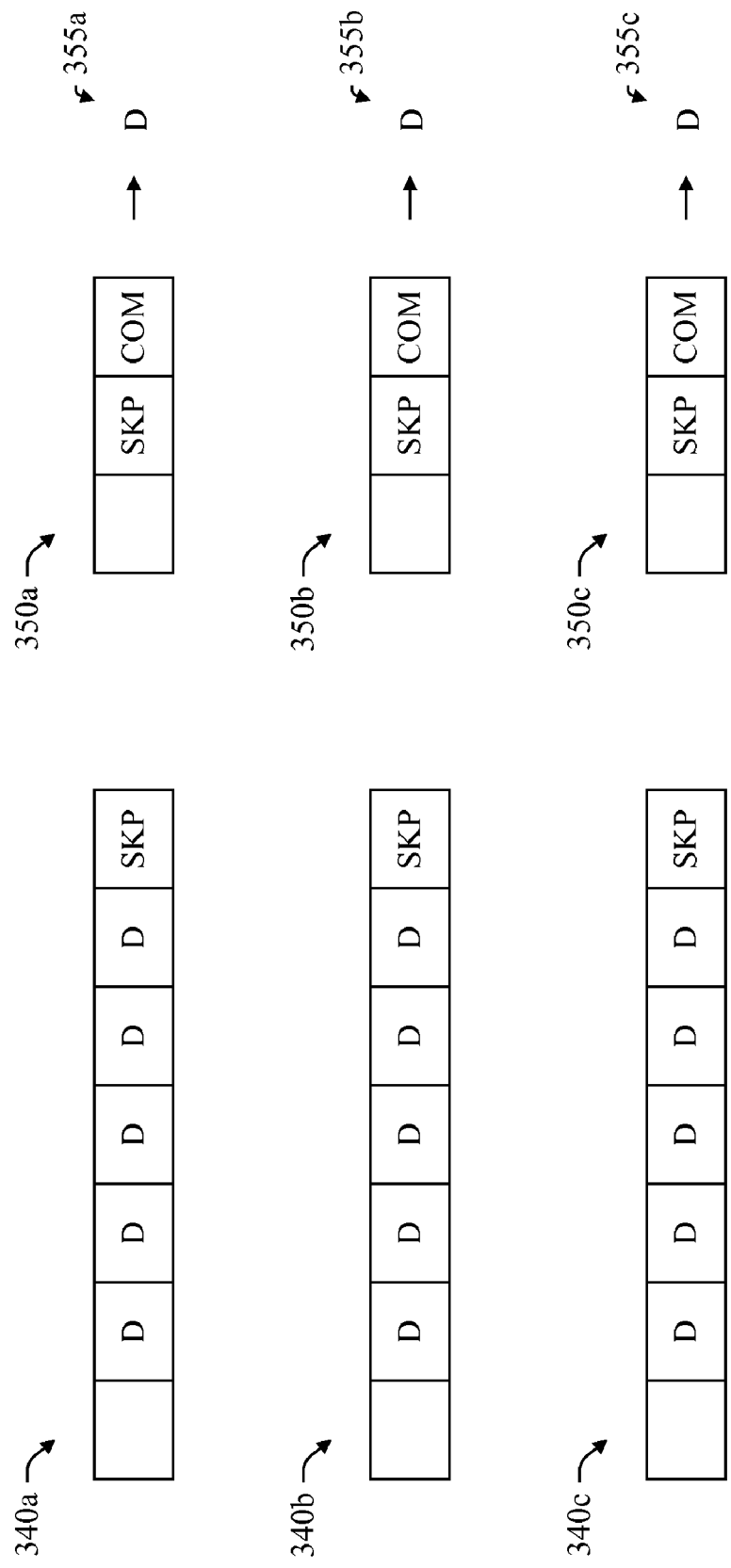

FIG. 4d illustrates the data buffers 340 and the data buffers 350 in the next clock cycle of the clock signal in the receiver 125. As may be envisioned from FIGS. 4c and 4d, each of the data buffers 350 has output a data symbol from the head of the data buffer 350 and each of the data buffers 340 has output a skip symbol from the head of the data buffer 340. Additionally, each of the data buffers 350 has received a skip symbol of the corresponding data stream 345 output from the head of the corresponding data buffer 340 but has not stored the skip symbol. In this way, each of the skip symbols output from the data buffers 340 is removed from the corresponding data streams 345 (e.g., the skip symbols are discarded). Further, each of the data buffers 340 has received a data symbol of the corresponding data stream 335 and stored the data symbol at the tail of the data buffer 340. As illustrated in FIG. 4d, each of the data buffers 350 contains a minimal skip ordered set but now has capacity to store an additional symbol (e.g., the data buffers 350 are not full to capacity). In this way, each of the data buffers 350 contracts.

Figure 4E:
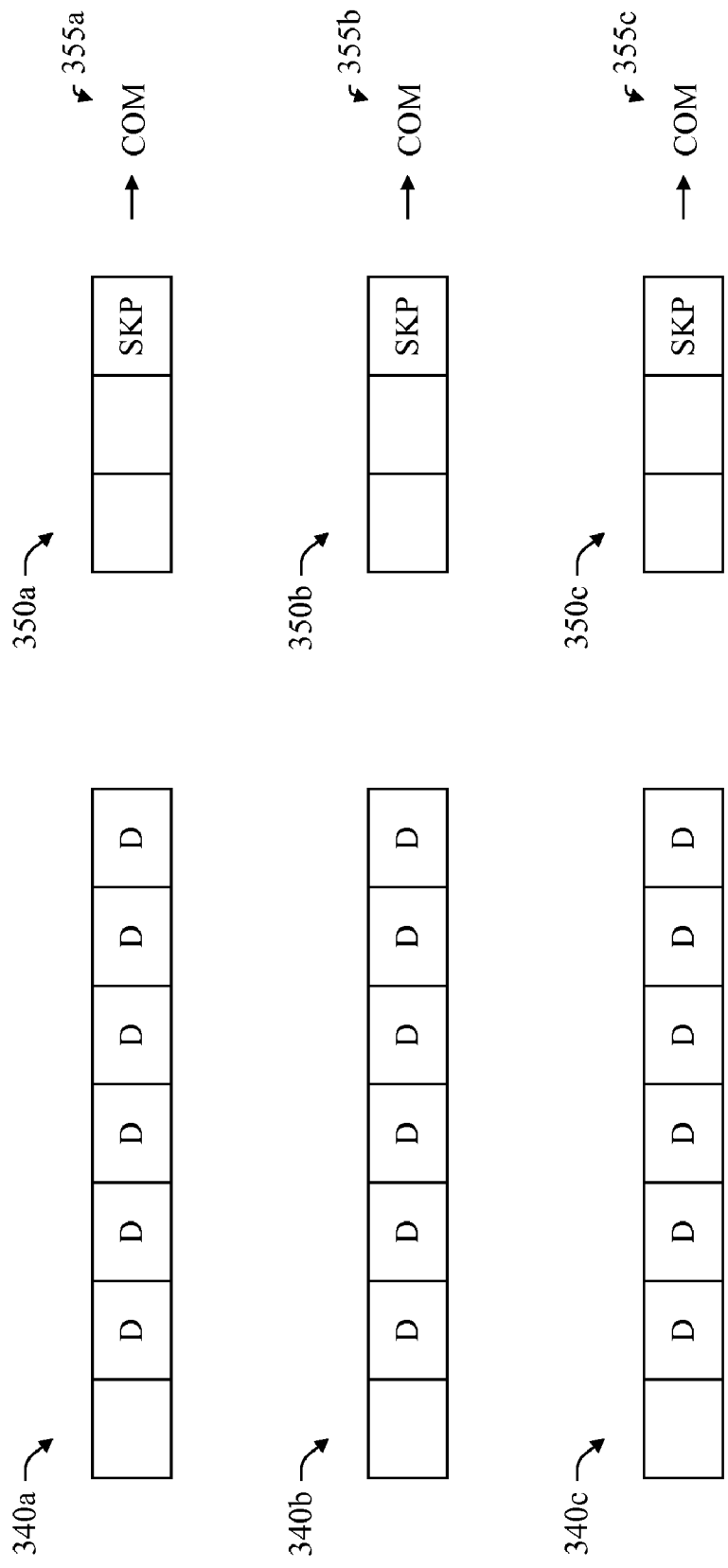

FIG. 4e illustrates the data buffers 340 and the data buffers 350 in the next clock cycle of the clock signal in the receiver 125. As may be envisioned from FIGS. 4d and 4e, each of the data buffers 350 has output a comma symbol from the head of the data buffer 350 and each of the data buffers 340 has output a skip symbol from the head of the data buffer 340. Additionally, each of the data buffers 350 has received a skip symbol of the corresponding data stream 345 output from the head of the corresponding data buffer 340 but has not stored the skip symbol. In this way, each of the skip symbols output from the data buffers 340 is removed from the corresponding data streams 345 (e.g., the skip symbols are discarded). Further, each of the data buffers 340 has received a data symbol of the corresponding data stream 335 and stored the data symbol at the tail of the data buffer 340. As illustrated in FIG. 4e, each of the data buffers 350 contains a skip symbol of a minimal skip ordered set and now has capacity to store two additional symbols. In this way, each of the data buffers 350 further contracts.

Figure 4F:
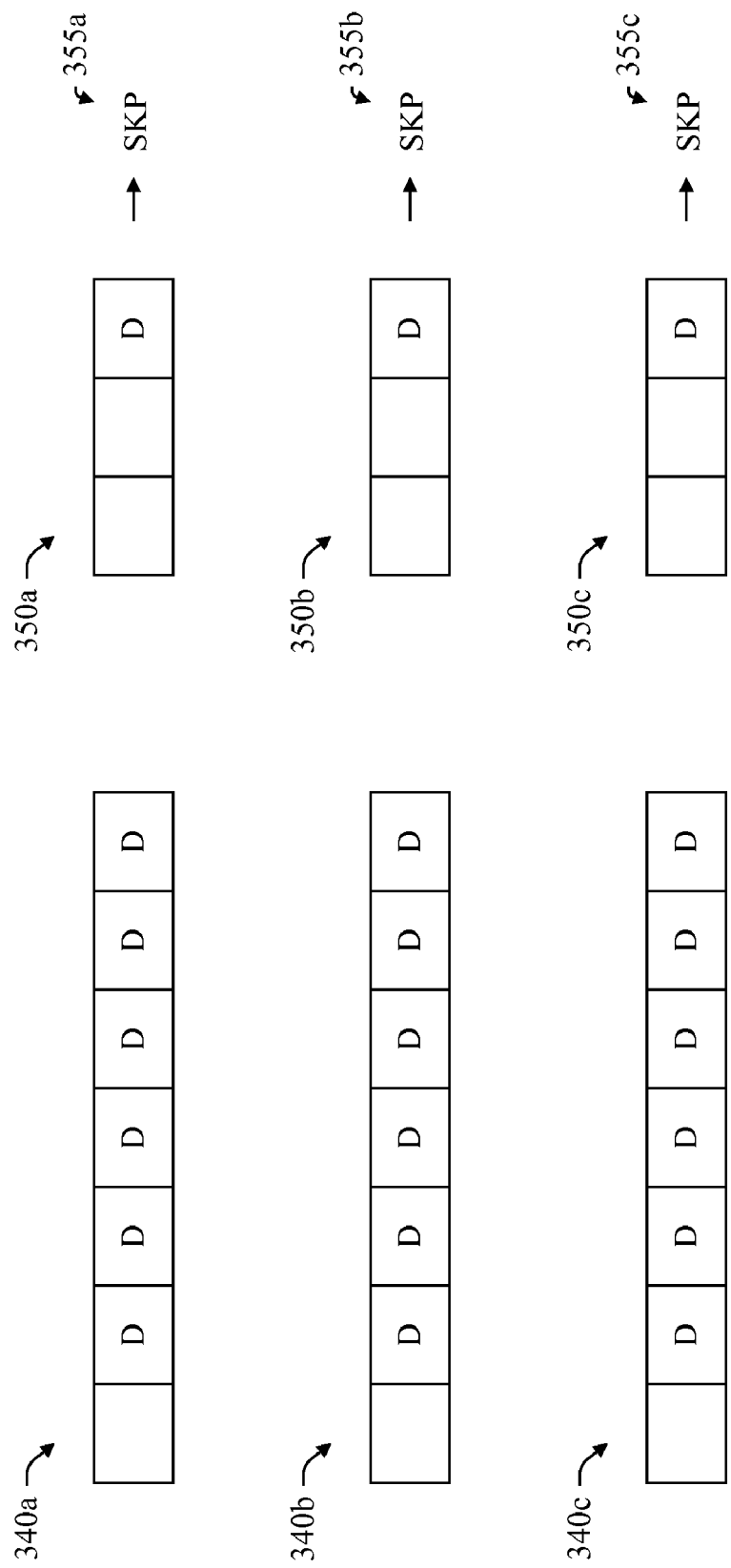

FIG. 4f illustrates the data buffers 340 and the data buffers 350 in the next clock cycle of the clock signal in the receiver 125. As may be envisioned from FIGS. 4e and 4f, each of the data buffers 350 has output a skip symbol from the head of the data buffer 350 and each of the data buffers 340 has output a data symbol from the head of the data buffer 340. Additionally, each of the data buffers 350 has received a data symbol of the corresponding data stream 345 output from the head of the corresponding data buffer 340 and has stored the data symbol at the tail of the data buffer 350. As illustrated in FIG. 4f, each of the data buffers 350 contains a data symbol at both the head and tail of the data buffer 350 and has capacity to store two additional symbols. Moreover, the data symbols at the heads of the data buffers 350 are aligned with each other.

Figure 4G:
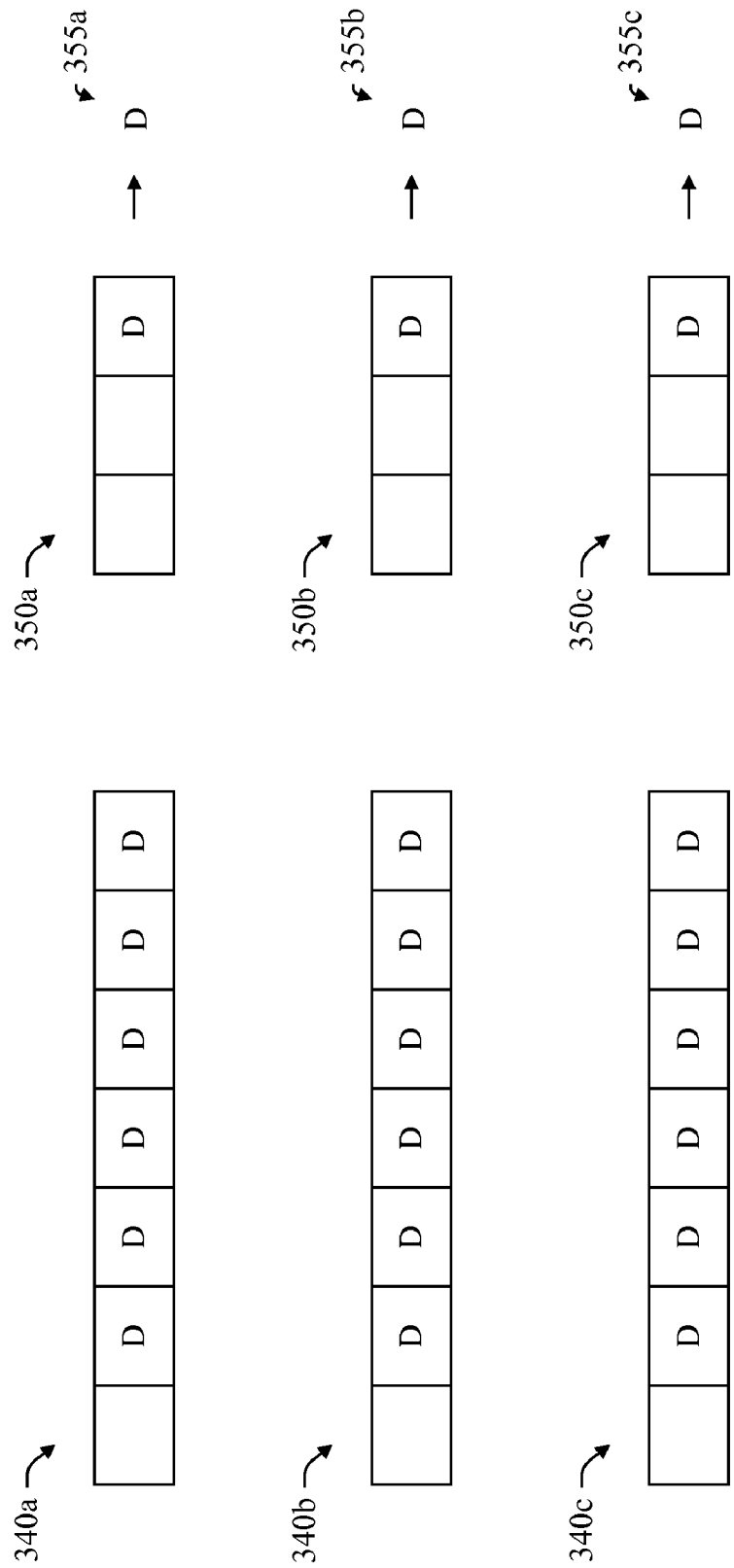

FIG. 4g illustrates the data buffers 340 and the data buffers 350 in the next clock cycle of the clock signal in the receiver 125. As may be envisioned from FIGS. 4f and 4g, the controller 365 has output a data symbol from the head of each of the data buffers 340. Additionally, each of the data buffers 350 has received a data symbol of the corresponding data stream 345 output from the head of the corresponding data buffer 340 and has stored the data symbol at the tail of the data buffer 350. Further, each of the data buffers 340 has received a data symbol of the corresponding data stream 335 and has stored the data symbol at the tail of the data buffer 340.

In subsequent clock cycles, the compensation module 310 may add skip symbols to skip ordered sets in the data streams 335 or delete skips symbols from skip ordered sets in the data streams 335. As a result, the number of data symbols in each of the data buffers 350 may increase. For example, each of the data buffers 350 may expand to include three data symbols, as illustrated in FIG. 4a.

Figure 5A:
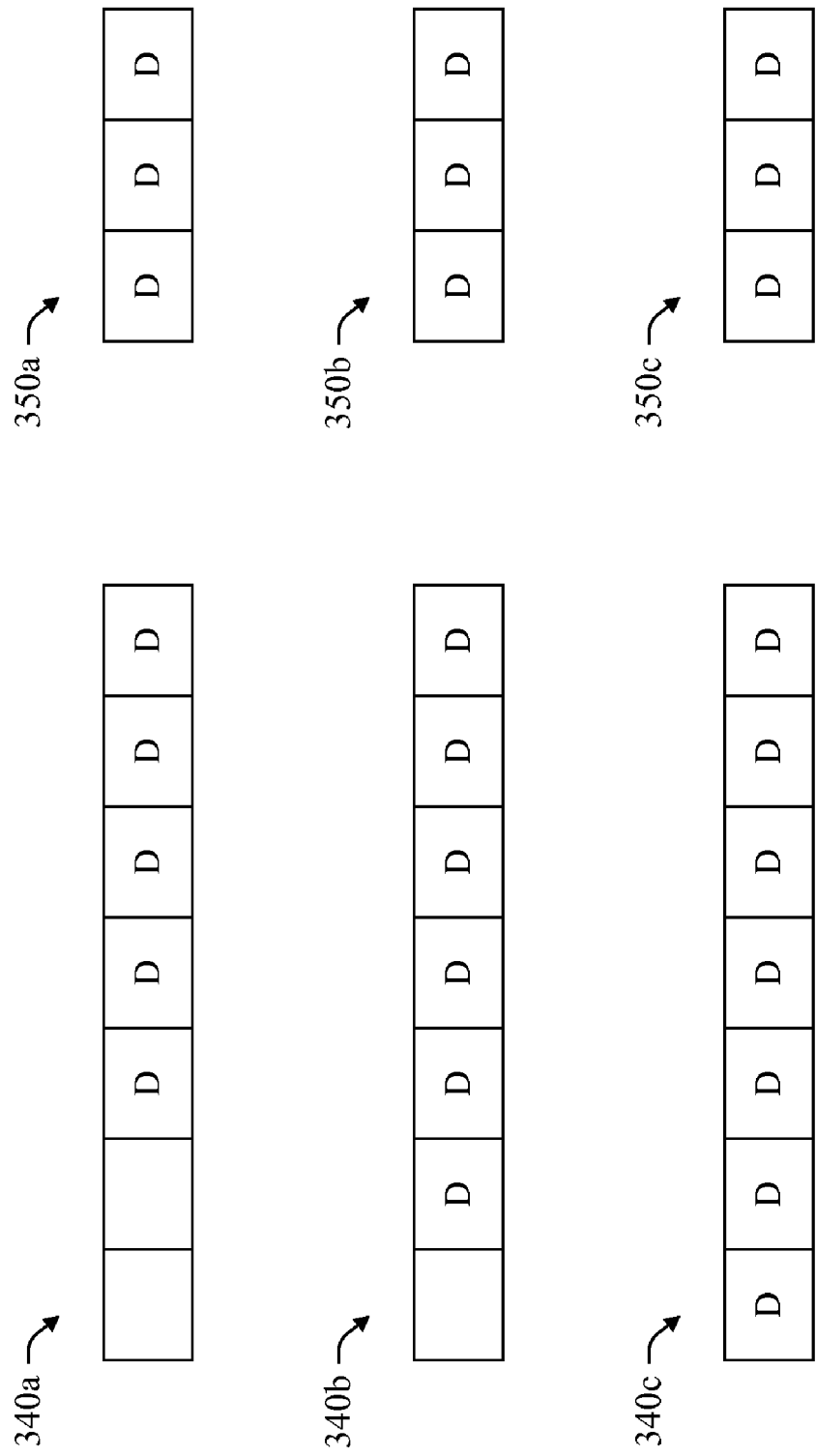
FIGS. 5a-n are block diagrams of data buffers in a receiver, in accordance with an embodiment of the present invention.
Figure 5B:
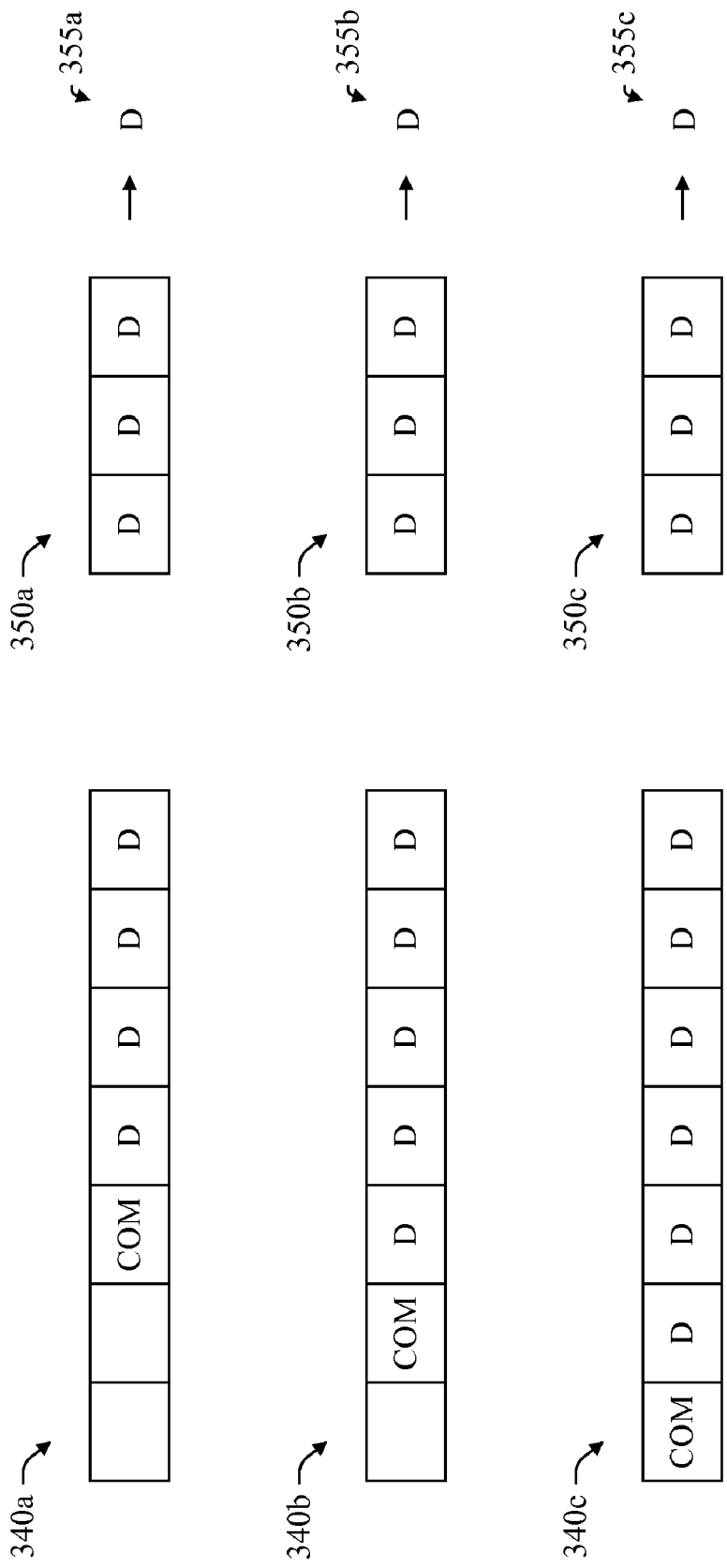
Figure 5C:
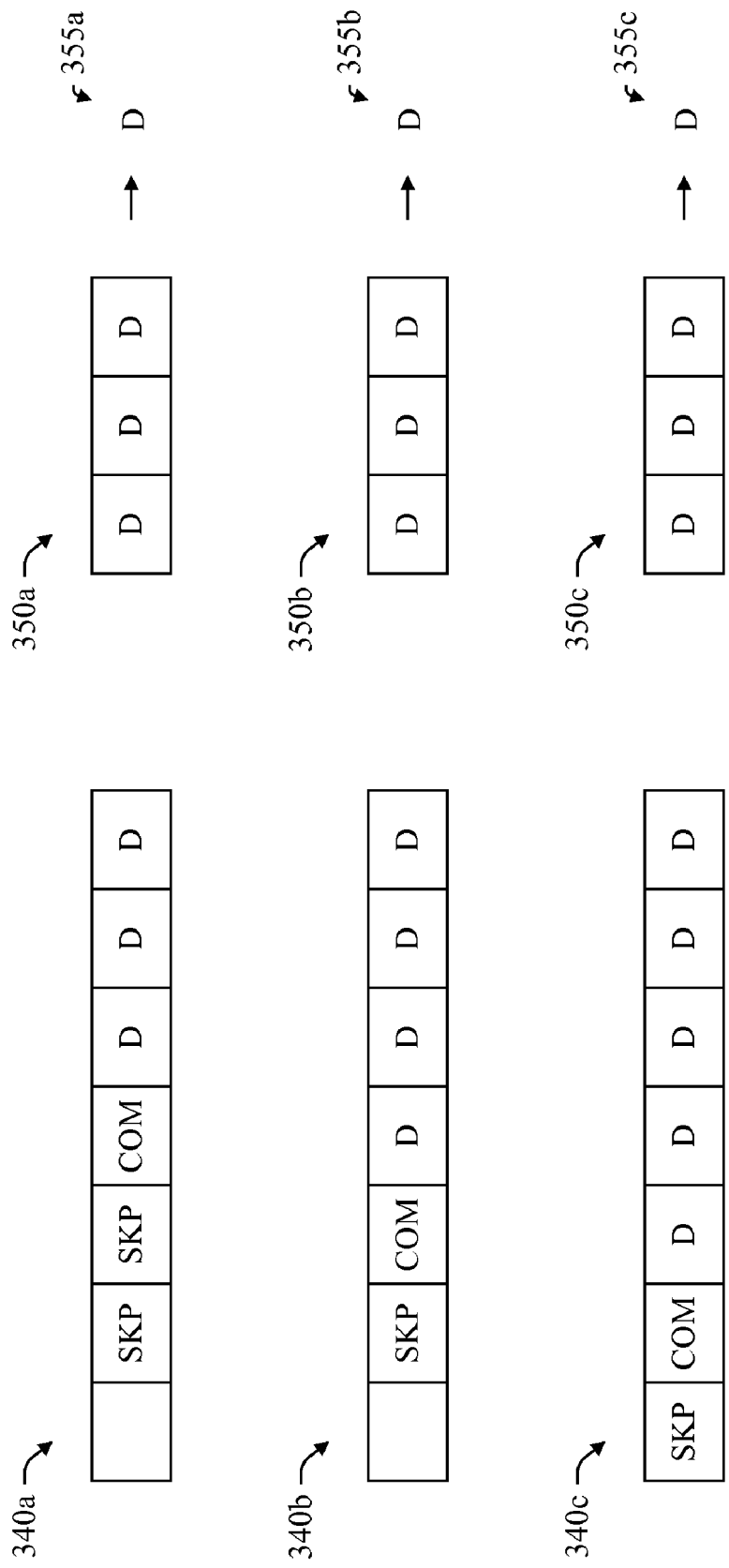
Figure 5D:
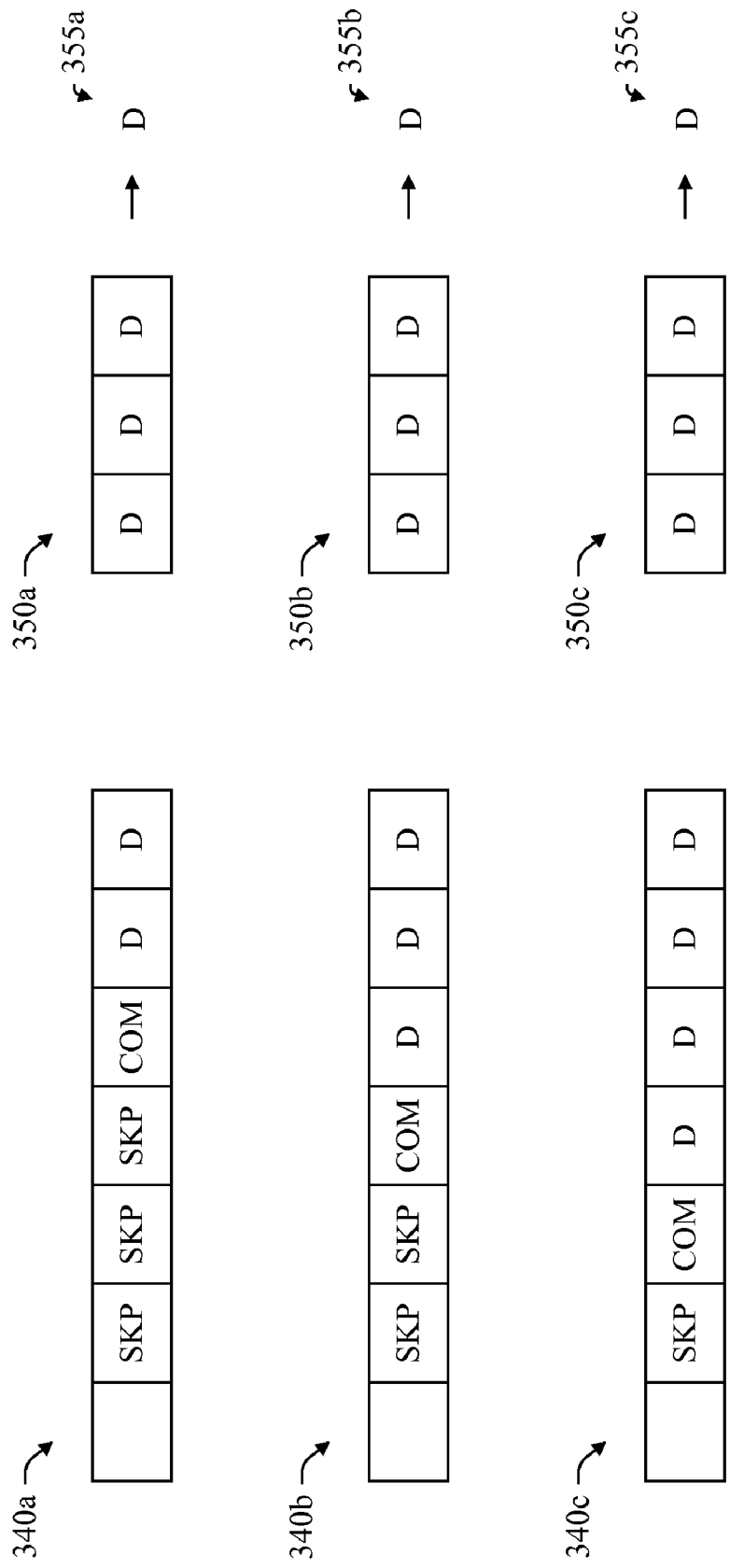
Figure 5E:
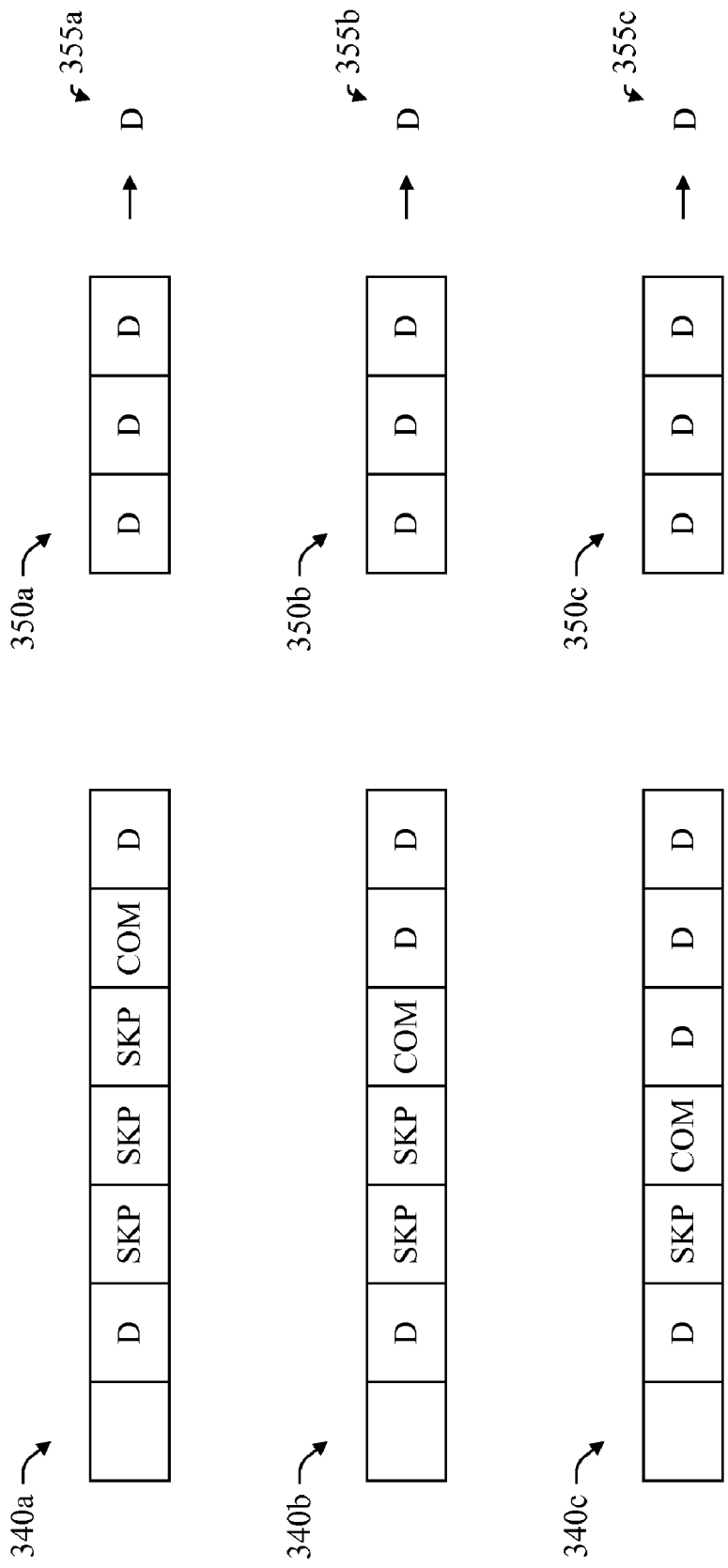
Figure 5F:
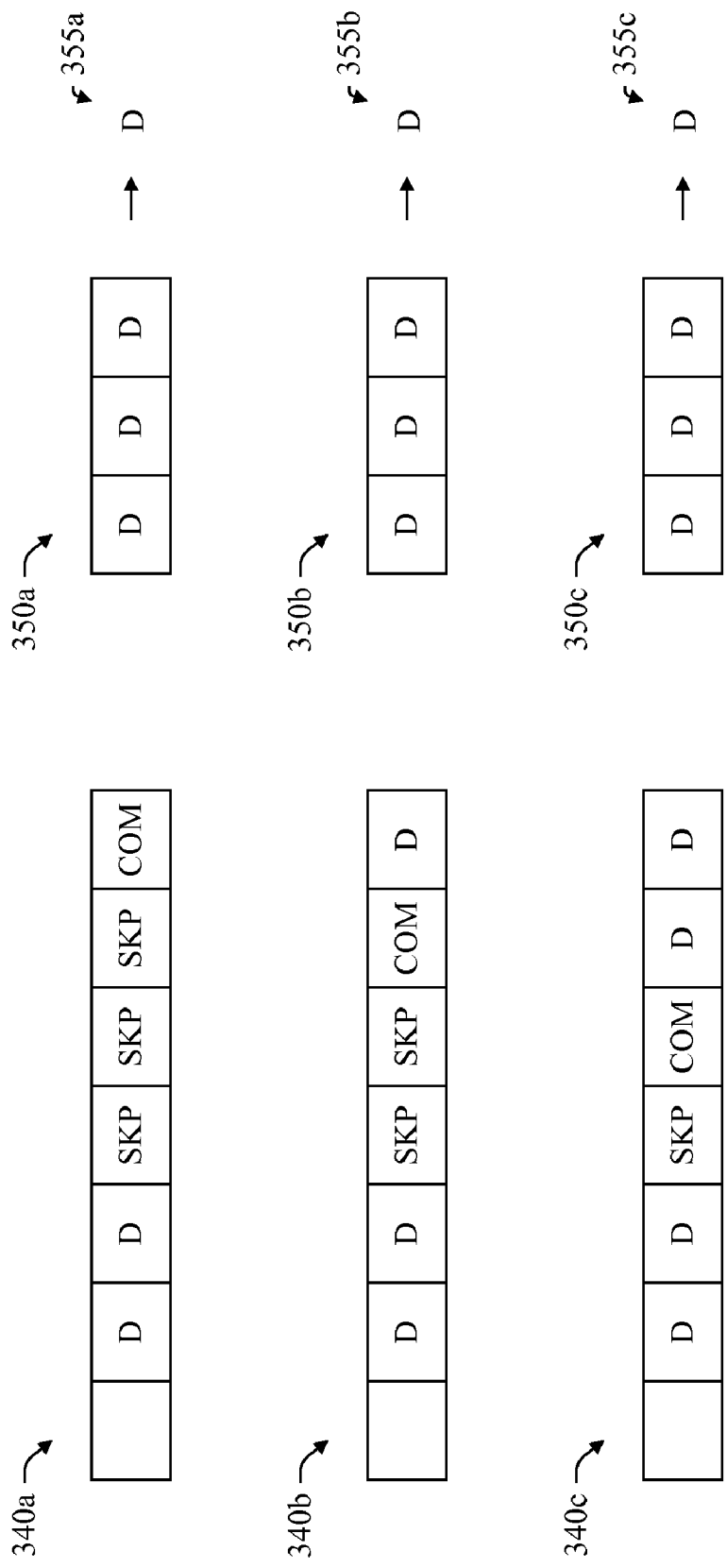
Figure 5G:
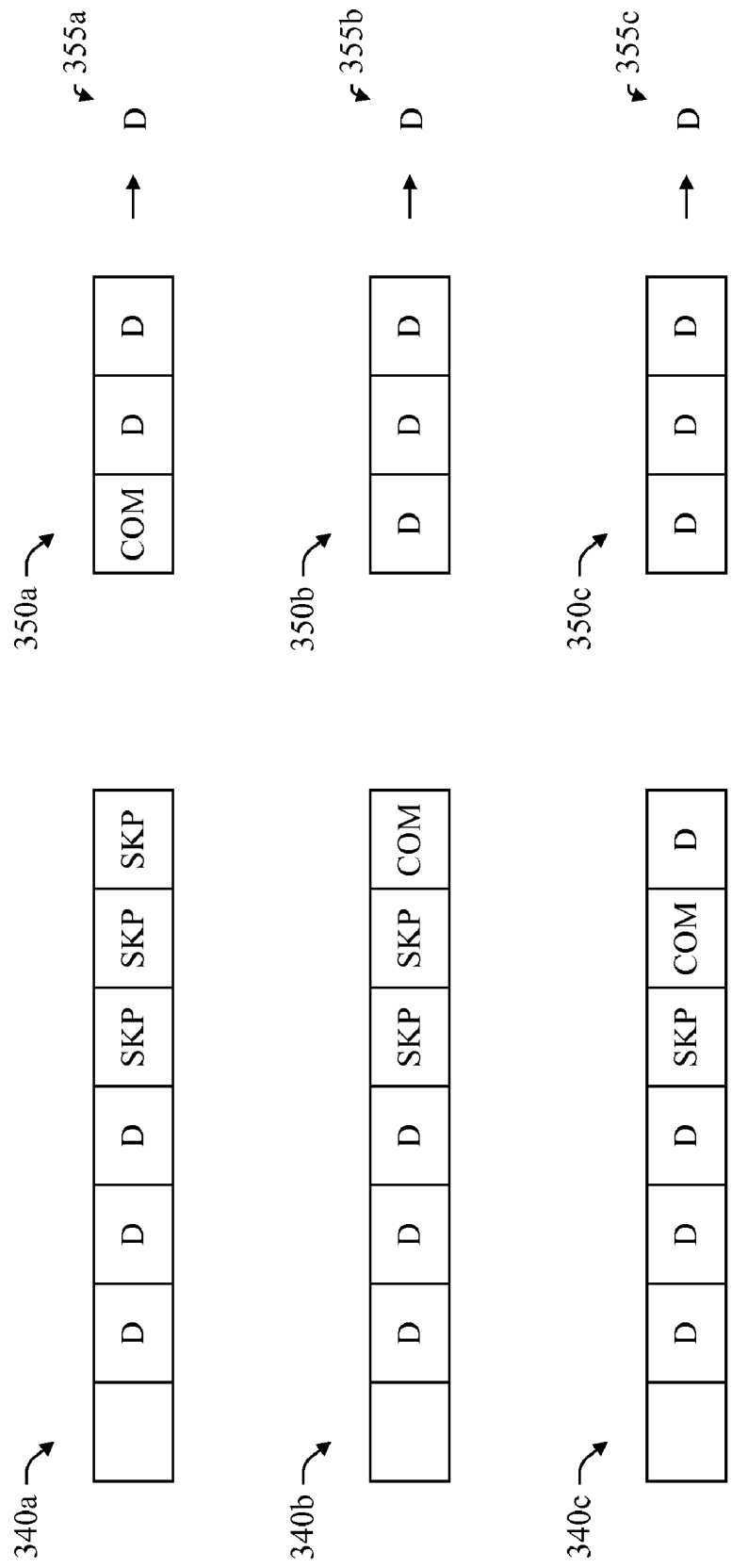
Figure 5H:
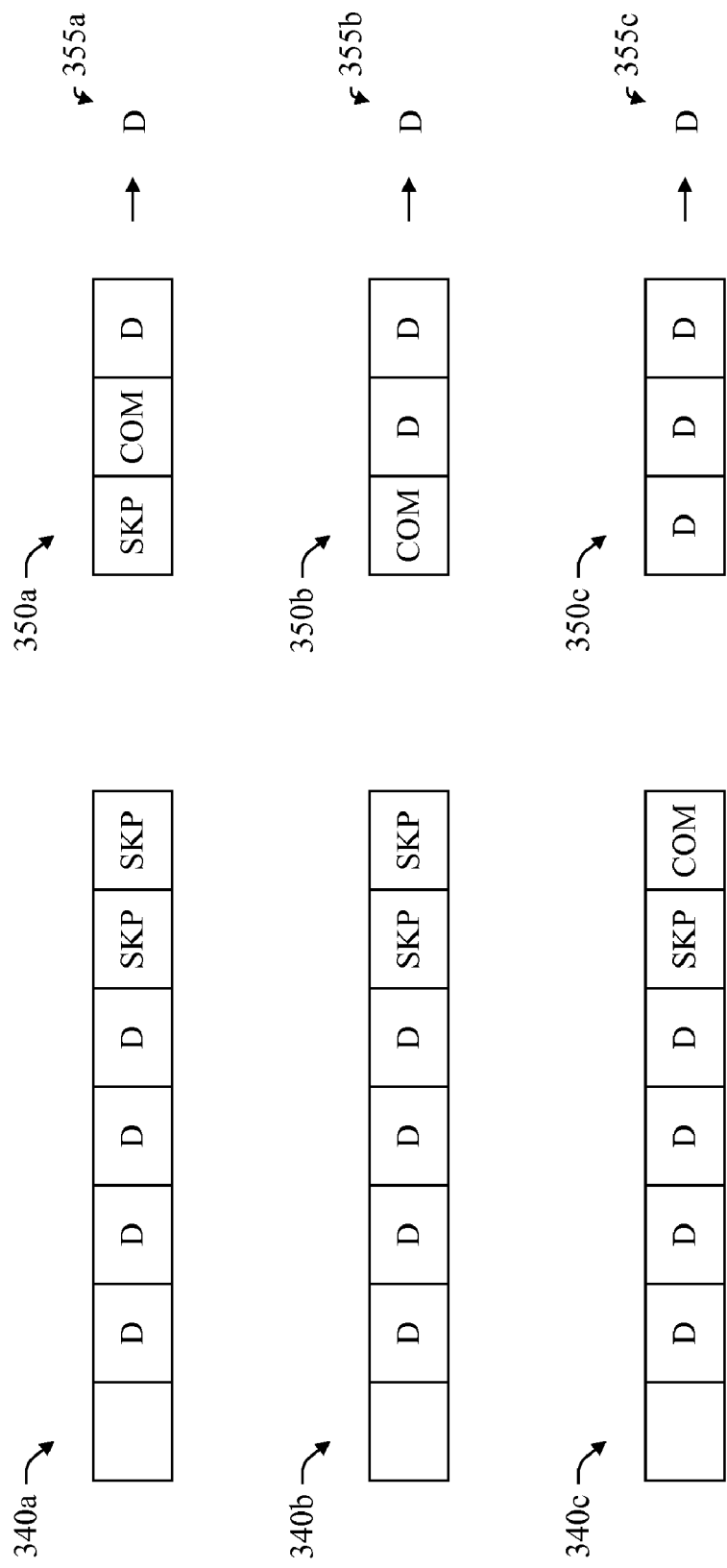
Figure 5I:
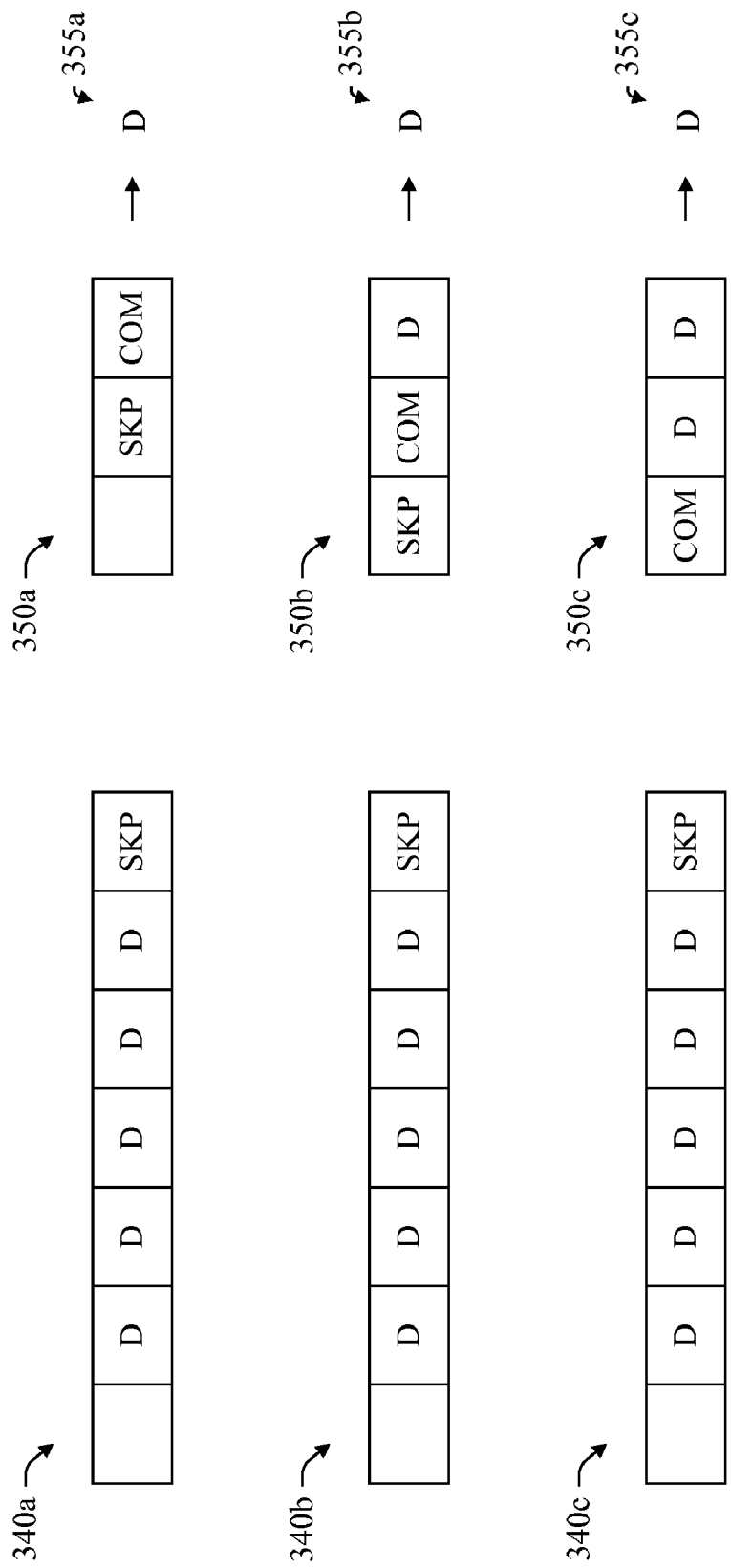
Figure 5J:
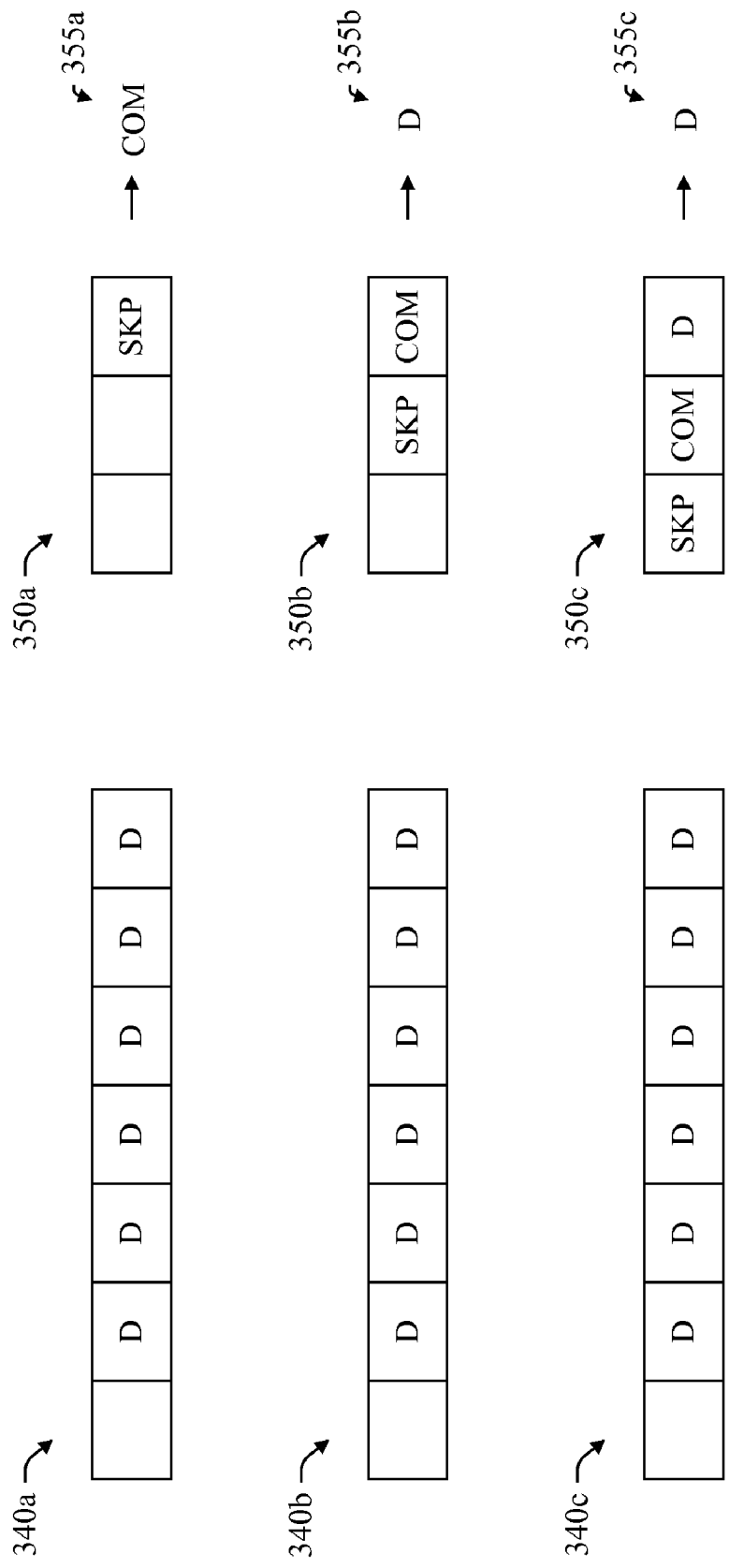
Figure 5K:
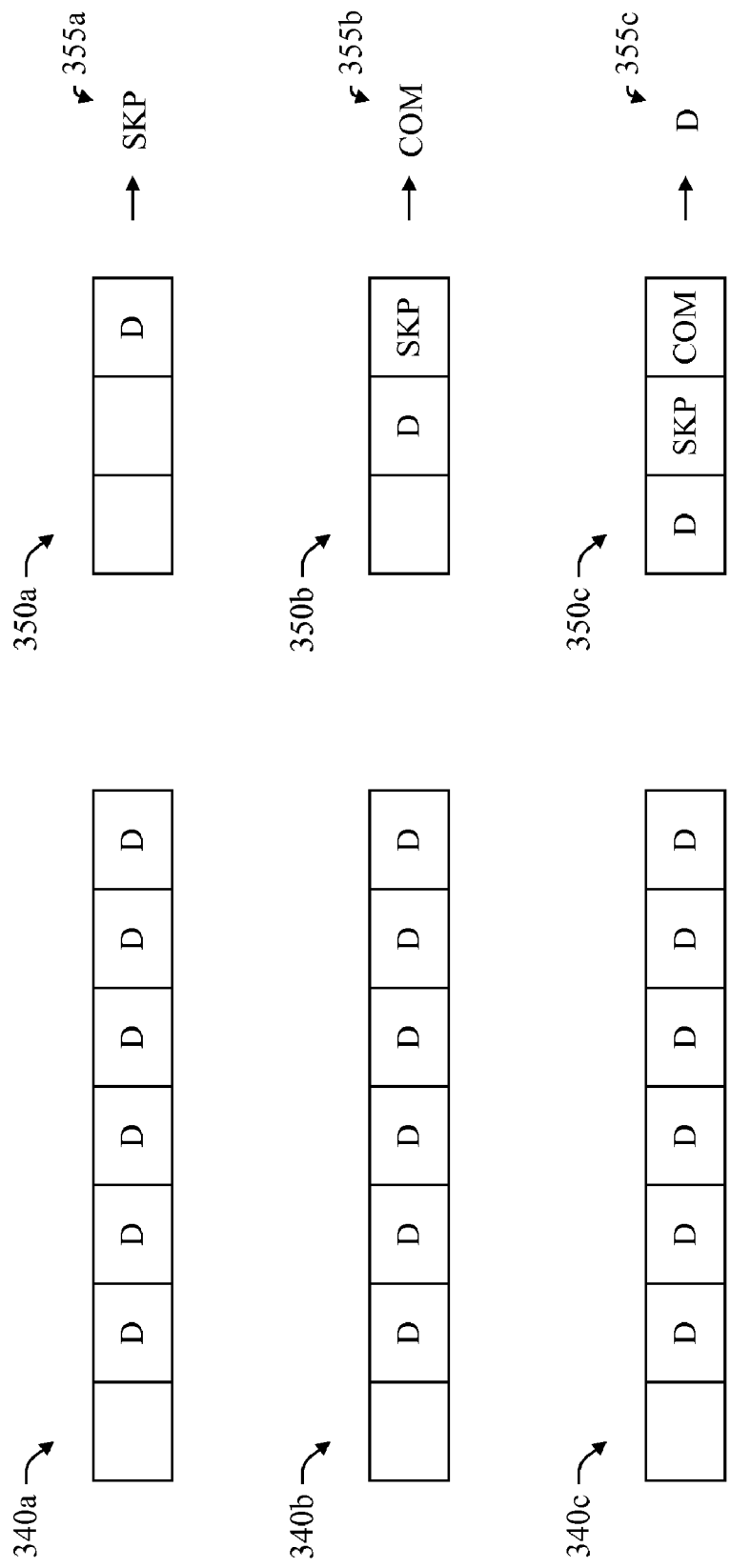
Figure 5L:
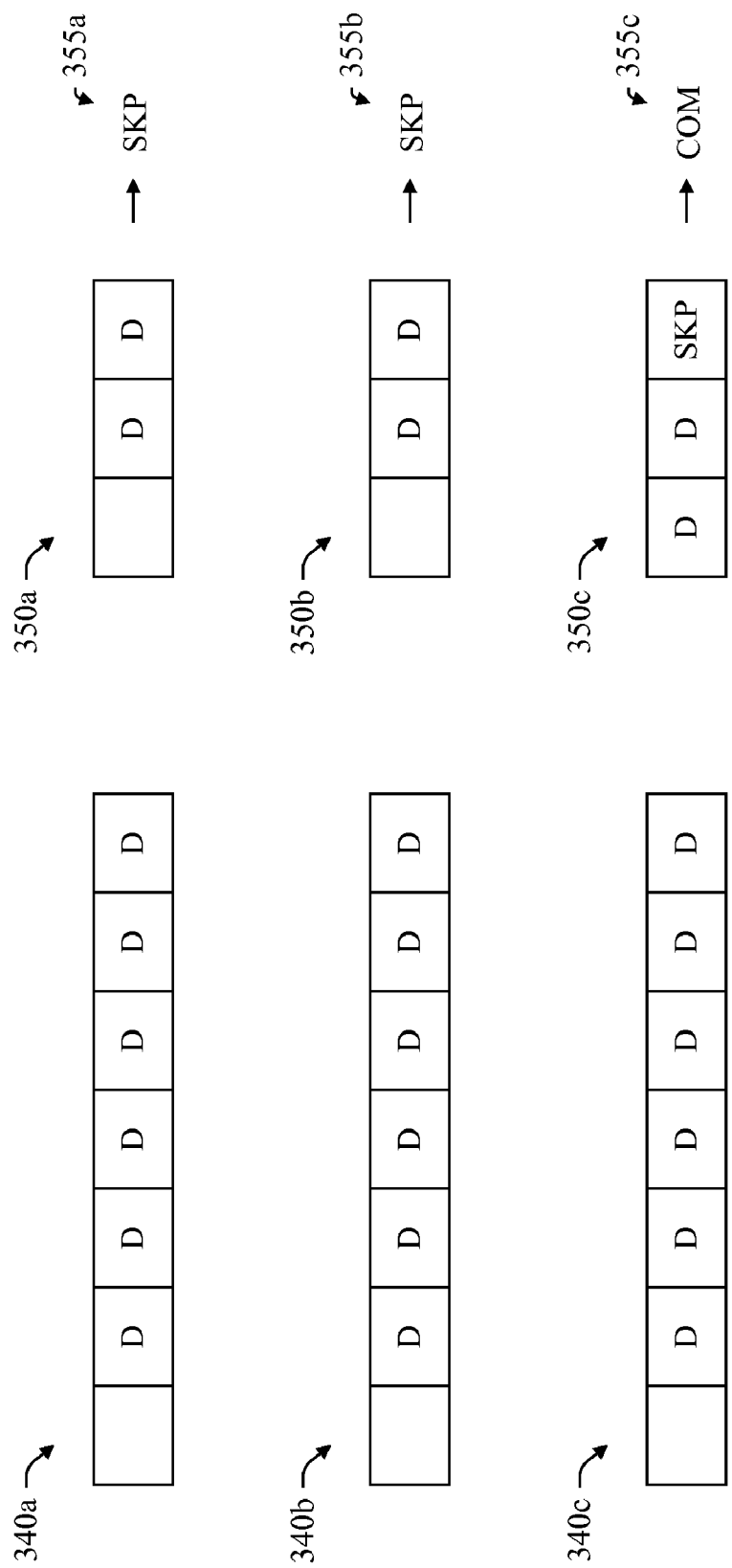
Figure 5M:
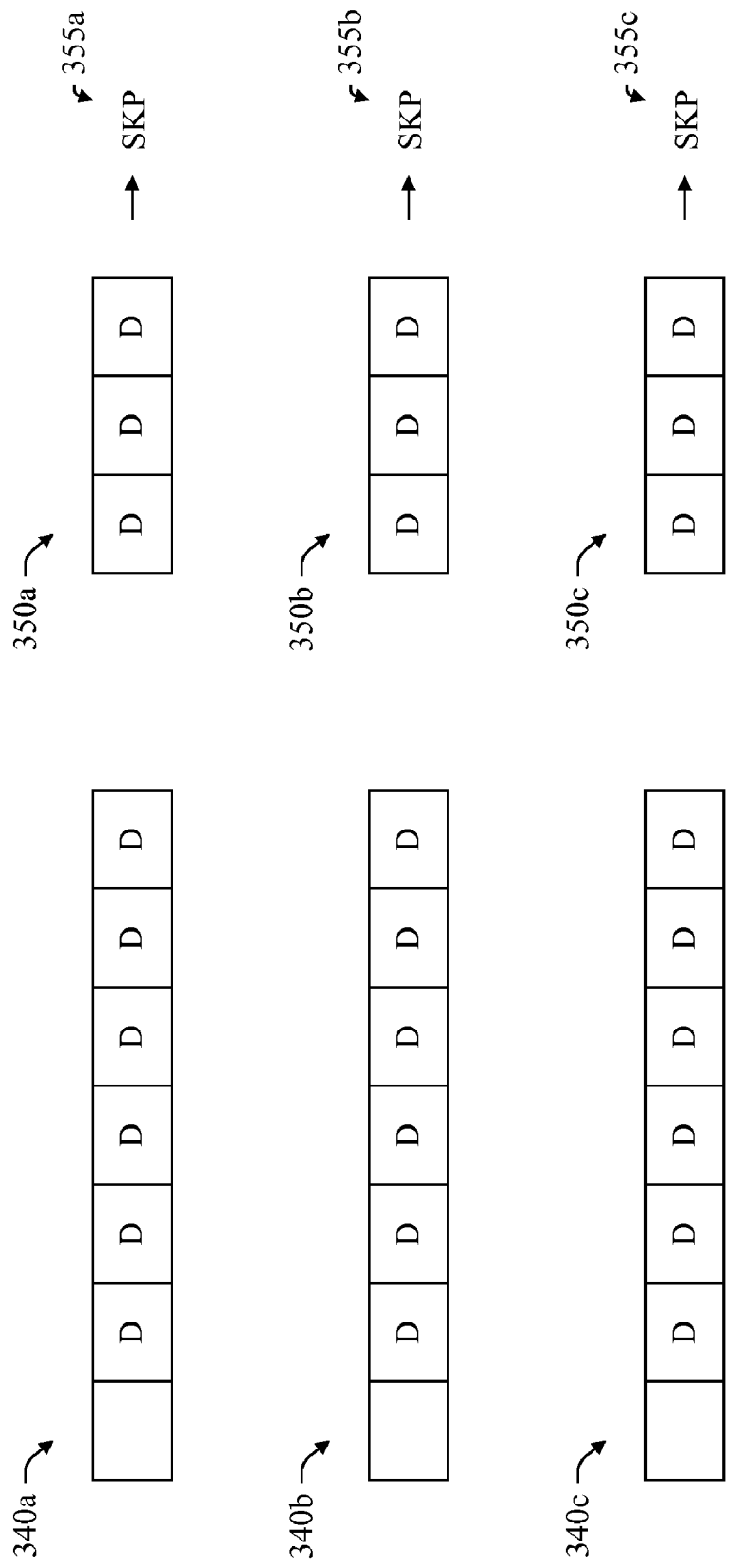
Figure 5N:
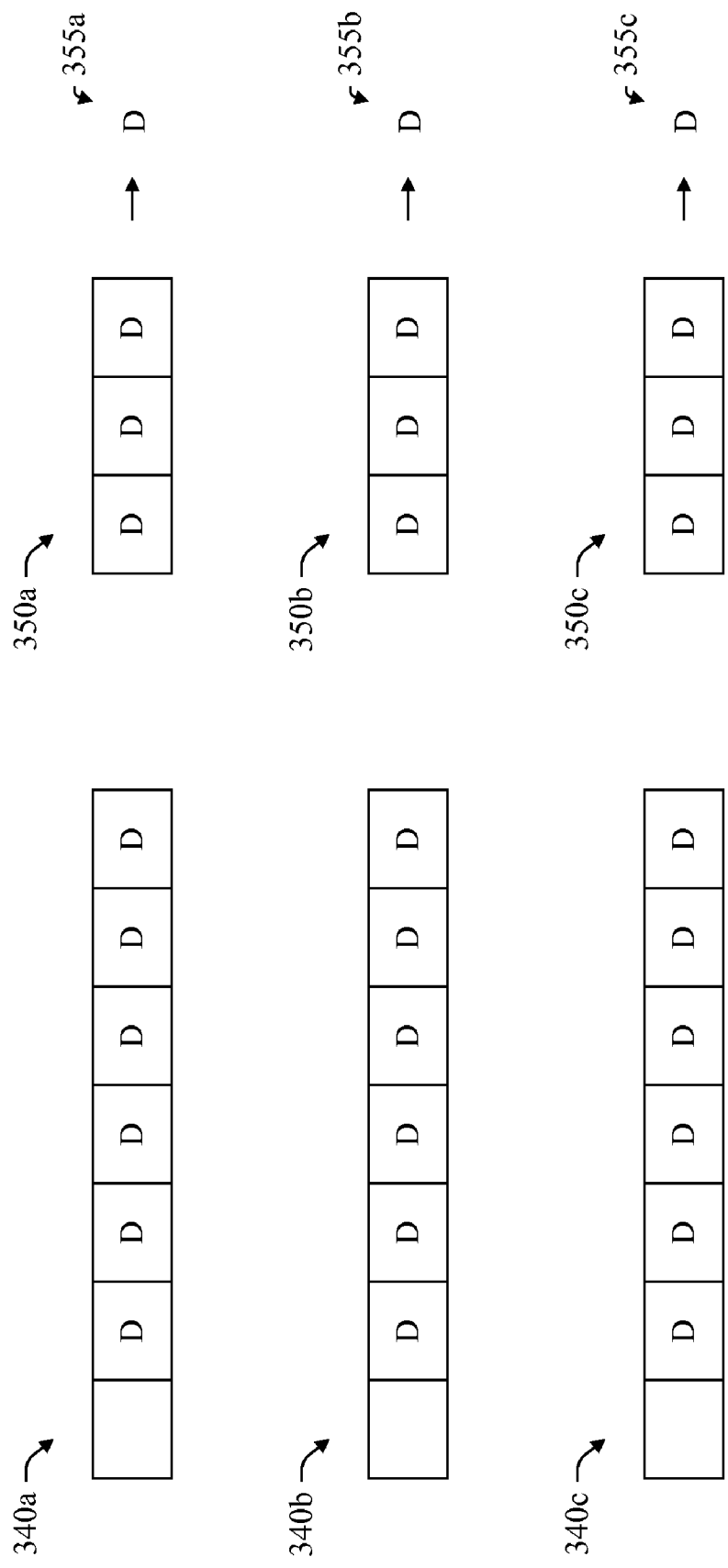

FIGS. 5a-n illustrate data buffers in the receiver 125, in accordance with an embodiment of the present invention. As illustrated in FIG. 5a, the data buffers 340 of the compensation module 310 contain symbols of exemplary data streams 335 and the data buffers 350 of the deskew module 315 contain symbols of exemplary data streams 345. The data buffer 340a contains five symbols, the data buffer 340b contains six symbols, and the data buffer 340c contains seven symbols. For example, the data rate of the data stream 335b may be faster than the data rate of the data stream 335a, and the data rate of the data stream 335c may be faster than the data rate of the data stream 335b. To avoid data underflow from occurring in the data buffer 340a and avoid data overflow from occurring in the data buffer 340c as a result of the different data rates, the compensation module 310 adds a skip symbol to a skip ordered set received by the data buffer 340a and deletes a symbol from a skip ordered set received by the data buffer 340c, as is illustrated in FIGS. 5c and 5d. In other embodiments, the data buffer 340a may contain more or fewer than five symbols, the data buffer 340b may contain more or fewer than six symbols, and the data buffer 340c may contain more or fewer than seven symbols. As illustrated in FIG. 5a, each of the data buffers 350 contains three symbols. In other embodiments, each of the data buffers 350 may contain more or fewer than three symbols.

As illustrated in FIG. 5a, each of the data buffers 340 has a data symbol at the tail of the data buffer 340 and another data symbol at the head of the data buffer 340. Further, the data buffer 340a has capacity to store two additional symbols without data overflow occurring in the data buffer 340 and the data buffer 340b has capacity to store an additional symbol without data overflow occurring in the data buffer 340b. The data buffer 340c does not have capacity to store an additional symbol without removing (e.g., outputting) a symbol already contained in the data buffer 340c. Each of the data buffers 350 has a data symbol at the tail of the data buffer 350 and another data symbol at the head of the data buffer 350 but does not have capacity to store an addition symbol without removing (e.g., outputting) a symbol already contained in the data buffer 350 (e.g., the data buffers 350 are full to capacity).

FIG. 5b illustrates the data buffers 340 and the data buffers 350 in the next clock cycle of the clock signal in the receiver 125. As may be envisioned from FIGS. 5a and 5b, each of the data buffers 350 has output a data symbol from the head of the data buffer 350 and each of the data buffers 340 has output a data symbol from the head of the data buffer 340. Additionally, each of the data buffers 350 has received a data symbol of the corresponding data stream 345 from the head of the corresponding data buffer 340 and has stored the data symbol at the tail of the data buffer 350. Further, each of the data buffers 340 has received a comma symbol of the corresponding data stream 335 and has stored the comma symbol at the tail of the data buffer 340.

FIG. 5c illustrates the data buffers 340 and the data buffers 350 in the next clock cycle of the clock signal in the receiver 125. As may be envisioned from FIGS. 5b and 5c, each of the data buffers 350 has output a data symbol from the head of the data buffer 350 and each of the data buffers 340 has output a data symbol from the head of the data buffer 340. Additionally, each of the data buffers 350 has received a data symbol of the corresponding data stream 345 from the head of the corresponding data buffer 340 and has stored the data symbol at the tail of the data buffer 350. Further, each of the data buffers 340 has received a skip symbol of the corresponding data stream 335 and has stored the skip symbol at the tail of the data buffer 340. As also illustrated in FIG. 5c, the compensation module 310 has added a skip symbol to the tail of the data buffer 340a. In this way, the compensation module 130 has modified the skip ordered set in the data stream 335a to avoid data underflow from occurring in the data buffer 340a.

FIG. 5d illustrates the data buffers 340 and the data buffers 350 in the next clock cycle of the clock signal in the receiver 125. As may be envisioned from FIGS. 5c and 5d, each of the data buffers 350 has output a data symbol from the head of the data buffer 350 and each of the data buffers 340 has output a data symbol from the head of the data buffer 340. Additionally, each of the data buffers 350 has received a data symbol of the corresponding data stream 345 from the head of the corresponding data buffer 340 and has stored the data symbol at the tail of the data buffer 350. Further, each of the data buffers 340 has received a skip symbol of the corresponding data stream 335. The data buffer 340a has stored the skip symbol received from the data stream 335a at the tail of the data buffer 340a and the data buffer 340b has stored the skip symbol received from the data stream 335b at the tail of the data buffer 340b. As may be further envisioned from FIGS. 5c and 5d, the compensation module 310 has deleted the skip symbol received by the data buffer 340c from the data stream 335c and the data buffer 340c has not stored that skip symbol. In this way, the compensation module 130 has modified the skip ordered set in the data stream 335c to avoid data overrun from occurring in the data buffer 340c.

FIG. 5e illustrates the data buffers 340 and the data buffers 350 in the next clock cycle of the clock signal in the receiver 125. As may be envisioned from FIGS. 5d and 5e, each of the data buffers 350 has output a data symbol from the head of the data buffer 350 and each of the data buffers 340 has output a data symbol from the head of the data buffer 340. Additionally, each of the data buffers 350 has received a data symbol of the corresponding data stream 345 from the head of the corresponding data buffer 340 and has stored the data symbol at the tail of the data buffer 350. Further, each of the data buffers 340 has received a data symbol of the corresponding data stream 335 and has stored the data symbol at the tail of the data buffer 340.

FIG. 5f illustrates the data buffers 340 and the data buffers 350 in the next clock cycle of the clock signal in the receiver 125. As may be envisioned from FIGS. 5e and 5f, each of the data buffers 350 has output a data symbol from the head of the data buffer 350 and each of the data buffers 340 has output a data symbol from the head of the data buffer 340. Additionally, each of the data buffers 350 has also received a data symbol of the corresponding data stream 345 from the head of the corresponding data buffer 340 and has stored the data symbol at the tail of the data buffer 350. Further, each of the data buffers 340 has received a data symbol of the corresponding data stream 335 and has stored the data symbol at the tail of the data buffer 340.

FIG. 5g illustrates the data buffers 340 and the data buffers 350 in the next clock cycle of the clock signal in the receiver 125. As may be envisioned from FIGS. 5f and 5g, each of the data buffers 350 has output a data symbol from the head of the data buffer 350, the data buffer 340a has output a comma symbol from the head of the data buffer 340a, the data buffer 340b has output a data symbol from the head of the data buffer 340b, and the data buffer 340c has output a data symbol from the head of the data buffer 340c. Additionally, the data buffer 350a has received the comma symbol output from the head of the data buffer 340a and has stored the comma symbol at the tail of the data buffer 350a. The data buffer 350b has received the data symbol output from the head of the data buffer 340b and has stored the data symbol at the tail of the data buffer 350b. The data buffer 350c has received the data symbol output from the head of the data buffer 340c and has stored the data symbol at the tail of the data buffer 350c. Further, each of the data buffers 340 has received a data symbol of the corresponding data stream 335 and has stored the data symbol at the tail of the data buffer 340.

FIG. 5h illustrates the data buffers 340 and the data buffers 350 in the next clock cycle of the clock signal in the receiver 125. As may be envisioned from FIGS. 5g and 5h, each of the data buffers 350 has output a data symbol from the head of the data buffer 350, the data buffer 340a has output a skip symbol from the head of the data buffer 340a, the data buffer 340b has output a comma symbol from the head of the data buffer 340b, and the data buffer 340c has output a data symbol from the head of the data buffer 340c. Additionally, the data buffer 350a has received the skip symbol output from the head of the data buffer 340a and has stored the skip symbol at the tail of the data buffer 350a. The data buffer 350b has received the comma symbol output from the head of the data buffer 340b and has stored the comma symbol at the tail of the data buffer 350b. The data buffer 350c has received the data symbol output from the head of the data buffer 340c and has stored the data symbol at the tail of the data buffer 350c. As illustrated in FIG. 5h, the data buffer 350a contains a minimal skip ordered set. Further, each of the data buffers 340 has received a data symbol of the corresponding data stream 335 and has stored the data symbol at the tail of the data buffer 340.

FIG. 5i illustrates the data buffers 340 and the data buffers 350 in the next clock cycle of the clock signal in the receiver 125. As may be envisioned from FIGS. 5h and 5i, each of the data buffers 350 has output a data symbol from the head of the data buffer 350. The data buffer 340a has output a skip symbol from the head of the data buffer 340a, the data buffer 340b has output a skip symbol from the head of the data buffer 340b, and the data buffer 340c has output a comma symbol from the head of the data buffer 340c. Additionally, the data buffer 350a has received the skip symbol output from the head of the data buffer 340a but has not stored the skip symbol at the tail of the data buffer 350a. In this way, the skip symbol output from the data buffers 340a is removed from the data stream 345a (e.g., the skip symbol is discarded). The data buffer 350b has received the skip symbol output from the head of the data buffer 340b and has stored the skip symbol at the tail of the data buffer 350b. The data buffer 350c has received the comma symbol output from the head of the data buffer 340c and has stored the comma symbol at the tail of the data buffer 350c. Additionally, each of the data buffers 340 has received a data symbol of the corresponding data stream 335 and has stored the data symbol at the tail of the data buffer 340. As illustrated in FIG. 5i, the data buffer 350a contains a minimal skip ordered set and the data buffer 350b contains a minimal skip ordered set. Further, the data buffer 350a has contracted and now has capacity to store an additional symbol.

FIG. 5j illustrates the data buffers 340 and the data buffers 350 in the next clock cycle of the clock signal in the receiver 125. As may be envisioned from FIGS. 5i and 5j, the data buffer 350a has output a comma symbol from the head of the data buffer 350a, the data buffer 350b has output a data symbol from the head of the data buffer 350b, and the data buffer 350c has output a data symbol from the head of the data buffer 350c. Additionally, each of the data buffers 340 has output a skip symbol from the head of the data buffer 340. The data buffer 350a has received the skip symbol output from the head of the data buffer 340a but has not stored the skip symbol. In this way, the skip symbol is removed from the data stream 335a. The data buffer 350b has received the skip symbol output from the head of the data buffer 340b but has not stored the skip symbol. In this way, the skip symbol is removed from the data stream 335b. The data buffer 350c has received the skip symbol output from the head of the data buffer 340c and has stored the skip symbol at the tail of the data buffer 350c. Additionally, each of the data buffers 340 has received a data symbol of the corresponding data stream 335 and has stored the data symbol at the tail of the data buffer 340. As illustrated in FIG. 5j, the data buffer 350b contains a minimal skip ordered set and the data buffer 350c contains a minimal skip ordered set. Further, the data buffer 350a has further contracted and now has capacity to store two addition symbols. The data buffer 350b has contracted and now has capacity to store an additional symbol.

FIG. 5k illustrates the data buffers 340 and the data buffers 350 in the next clock cycle of the clock signal in the receiver 125. As may be envisioned from FIGS. 5j and 5k, the data buffer 350a has output a skip symbol from the head of the data buffer 350a, the data buffer 350b has output a comma symbol from the head of the data buffer 350b, and the data buffer 350c has output a data symbol from the head of the data buffer 350c. Additionally, each of the data buffers 340 has output a data symbol from the head of the data buffer 340. Each of the data buffers 350 has received a data symbol output from the head of the corresponding data buffer 340 and has stored the data symbol at the tail of the data buffer 350. Additionally, each of the data buffers 340 has received a data symbol of the corresponding data stream 335 and has stored the data symbol at the tail of the data buffer 340. As illustrated in FIG. 5k, the data buffer 350c contains a minimal skip ordered set.

FIG. 5l illustrates the data buffers 340 and the data buffers 350 in the next clock cycle of the clock signal in the receiver 125. As may be envisioned from FIGS. 5k and 5l, the data buffer 350a has not output the data symbol at the head of the data buffer 350a but has held the data symbol at the head of the data buffer 350a. The controller 365 has added a skip symbol to the data stream 355a, the data buffer 350b has output a skip symbol from the head of the data buffer 350b, and the data buffer 350c has output a comma symbol from the head of the data buffer 350c. Additionally, each of the data buffers 340 has output a data symbol from the head of the data buffer 340. Each of the data buffers 350 has received a data symbol output from the head of the corresponding data buffer 340 and has stored the data symbol at the tail of the data buffer 350. Additionally, each of the data buffers 340 has received a data symbol of the corresponding data stream 335 and has stored the data symbol at the tail of the data buffer 340. As illustrated in FIG. 5l, the data buffer 350a has expanded and now has capacity to store one addition symbol.

FIG. 5m illustrates the data buffers 340 and the data buffers 350 in the next clock cycle of the clock signal in the receiver 125. As may be envisioned from FIGS. 5l and 5m, the data buffer 350a has not output the data symbol at the head of the data buffer 350a but has held the data symbol at the head of the data buffer 350a. Similarly, the data buffer 350b has not output the data symbol at the head of the data buffer 350b but has held the data symbol at the head of the data buffer 350b.

The controller 365 has added a skip symbol to the data stream 355a and a skip symbol to the data stream 355b. The data buffer 350c has output a skip symbol from the head of the data buffer 350c. Additionally, each of the data buffers 340 has output a data symbol from the head of the data buffer 340. Each of the data buffers 350 has received the data symbol output from the head of the corresponding data buffer 340 and has stored the data symbol at the tail of the data buffer 350. Additionally, each of the data buffers 340 has received a data symbol of the corresponding data stream 335 and has stored the data symbol at the tail of the data buffer 340. As illustrated in FIG. 5m, the data buffer 350a has further expanded and does not have capacity to store an addition symbol. Moreover, each of the data buffers 350 contains three data symbols and the data symbols at the heads of the data buffers 350 are aligned with each other.

FIG. 5n illustrates the data buffers 340 and the data buffers 350 in the next clock cycle of the clock signal in the receiver 125. As may be envisioned from FIGS. 5m and 5n, each of the data buffers 350 has output a data symbol from the head of the data buffer 350. Additionally, each of the data buffers 340 has output a data symbol from the head of the data buffer 340. Each of the data buffers 350 has received the data symbol output from the head of the corresponding data buffer 340 and has stored the data symbol at the tail of the data buffer 350. Additionally, each of the data buffers 340 has received a data symbol of the corresponding data stream 335 and has stored the data symbol at the tail of the data buffer 340. Moreover, the data symbols at the heads of the data buffers 350 are aligned with each other.

In subsequent clock cycles, the data buffers 340 may receive data symbols at respective data rates that differ slightly from each other before each of the data buffers 340 receives another skip ordered set. As a result, the number of data symbols in a data buffer 340 may differ from the number of data symbols in another data buffer 340. For example, the data buffer 340a may contain five data symbols, the data buffer 340b may contain six data symbols, and the data buffer 340c may contain seven data symbols, as illustrated in FIG. 5a.

Figure 6:
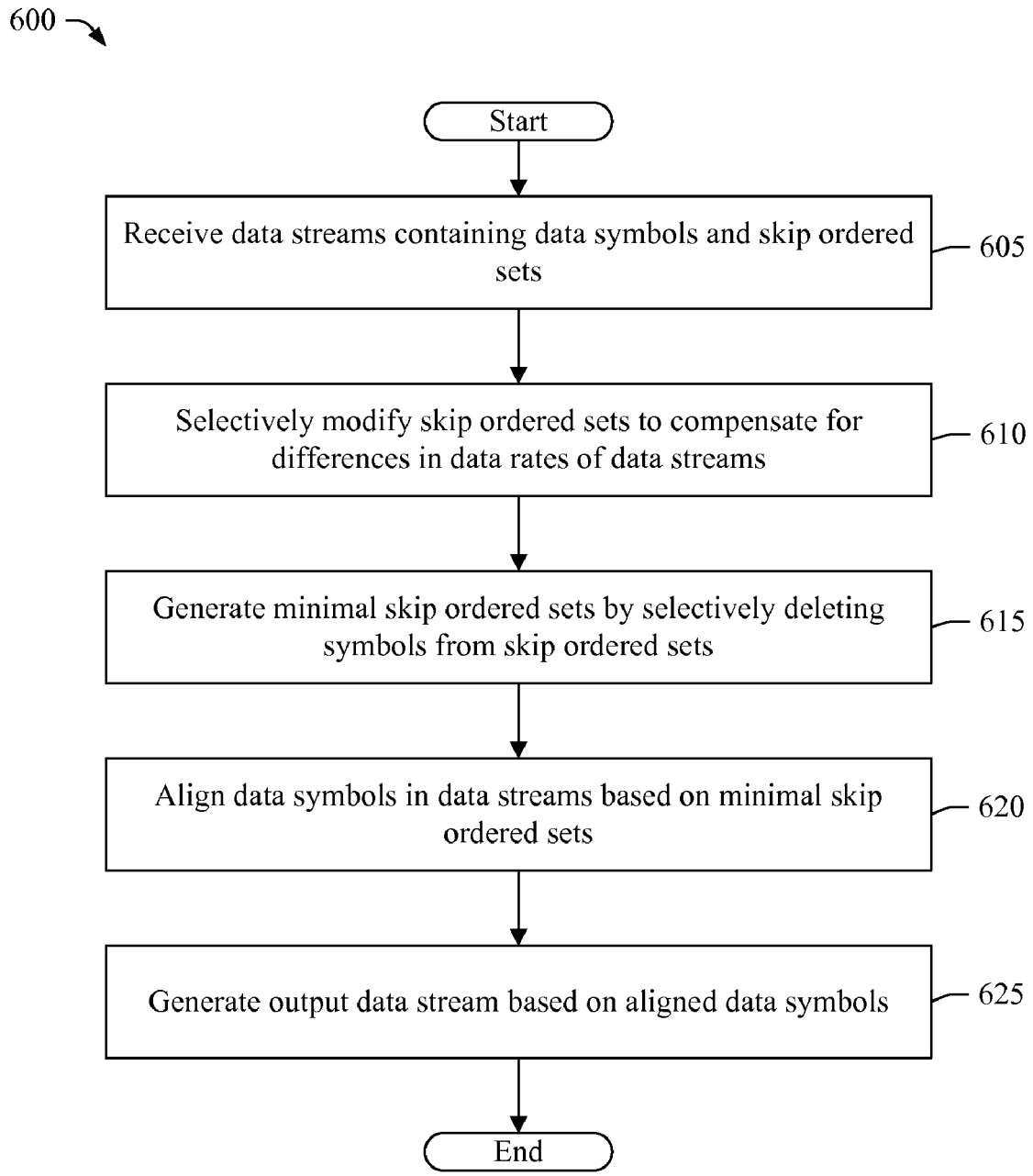
FIG. 6 is a flow chart of a method for aligning data symbols in data streams, in accordance with an embodiment of the present invention.

FIG. 6 is a flow chart of a method 600 for aligning symbols in data streams, in accordance with an embodiment of the present invention. In step 605, data streams containing data symbols and skip ordered sets are received. In one embodiment, the receiver 125 receives the data streams 115, each of which contains a skip ordered set. The method 600 then proceeds to step 610.

In step 610, the skip ordered sets in the data streams are selectively modified to compensate for differences in data rates of the data streams. In one embodiment, the compensation module 310 selectively modifies symbols in the skip ordered sets of the data streams 115 by selectively adding symbols to skip ordered sets and selectively deleting symbols from skip ordered sets in the data streams 335. For example, the deserializer module 300 may generate the data streams 325 by deserializing symbols in the data streams 115, the decoder module 305 may decode symbols in the data streams 115 by decoding symbols in the data streams 325, and the compensation module 310 may selectively modify symbols in the data streams 115 by selectively adding symbols to, or deleting symbols from, skip ordered sets in the data streams 335 as described more fully herein in relation to FIGS. 5c and 5d. The method 600 then proceeds to step 615.

In step 615, minimal skip ordered sets are generated by selectively deleting symbols from the skip ordered sets. In one embodiment the deskew module 315 generates minimal skip ordered sets by selectively deleting symbols from the skip ordered sets in the data streams 345. Although each of the minimal skip ordered sets has a same predetermined number of symbols, a symbol need not be deleted from each skip ordered set in the data streams 345 to generate the minimal skip ordered sets. For example, a skip ordered set in a data stream 345 may have the same number of symbols as a minimal skip ordered set generated from skip ordered set in the data stream 345, namely the predetermined number of symbol. The method 600 then proceeds to step 620.

In step 620, data symbols in the data streams are aligned based on the minimal skip ordered sets. In one embodiment, the deskew module 315 aligns data symbols in the data streams 345 by aligning data symbols of the data streams 345 stored in data buffers 350 of the deskew module 315 based on the minimal skip ordered sets and generating the data streams 355 based on the minimal skip ordered sets and the data symbols.

In various embodiment, the deskew module 315 aligns data symbols stored in the deskew module 315 by selectively adding symbols to the minimal skip ordered sets in the data streams 355 without storing the added symbols in the data buffers 350 of the deskew module 315. In some embodiments, the deskew module 315 aligns data symbols stored in the deskew module 315 by selectively adding symbols to the minimal skip ordered sets in the data streams 355 without storing the added symbols in the deskew module 315. In some embodiments, the deskew module 315 aligns data symbols stored in the deskew module 315 by selectively adding symbols to the minimal skip ordered sets in the data streams 345 without storing the added symbols in the receiver 125. The method 600 then proceeds to step 625.

In step 625, an output data stream is generated based on the aligned data symbols. In one embodiment, the collator 360 generates the data stream 130 (e.g., the output data stream) based on the minimal skip ordered sets and data symbols aligned at the heads of the data buffers 350 in the deskew module 315. For example, the collator 360 may receive symbols from the heads of the data buffers 350 and collate the symbols to generate the data stream 130. In some embodiments, the collator 360 receives symbols from the heads of the data buffers 350 and receives symbols added to the minimal skip ordered sets from the controller 365. In these embodiments, the collator 360 generates the data steams 130 by collating symbols received from the data buffers 350 and the controller 365.

In some embodiments, the collator 360 receives symbols from the heads of the data buffers 350 and receives a control signal from the controller 365 for adding symbols to minimal skip ordered sets in the data streams 355. In these embodiments, the collator 360 generates the data streams 130 by collating symbols received from the data buffers 350 and inserting symbols in minimal skip ordered sets of the data streams 355 (e.g., appending symbols to minimal skip ordered sets in the data streams 355) based on the control signal. In some embodiments, the collator 360 stores symbols and generates the data stream 130 based on the stored symbols. In other embodiments, the collator 360 generates the data stream 130 without storing symbols, for example by passing symbols through the collator 360 or generating symbols based on a control signal received from the controller 365. The method 600 then ends.

In various embodiments, one or more of the steps 605-625 of the method 600 may be performed in a different order than that described above and illustrated in FIG. 6. In some embodiments, the method 600 may include more or fewer steps than the steps 605-625. In various embodiments, two or more of the steps 605-625 may be performed in parallel with each other or substantially simultaneously with each other.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A system comprising:
a compensation module configured to receive a plurality of data streams each having a data rate and comprising a plurality of symbols including data symbols and a skip ordered set comprising a number of symbols, the compensation module further configured to selectively modify the number of symbols in the skip ordered sets of the plurality of data streams to compensate for differences in the data rates of the data streams in the plurality of data streams; and
a deskew module coupled to the compensation module and configured to generate minimal skip ordered sets each having a same predetermined number of symbols by selectively deleting at least one symbol in the skip ordered sets of the plurality of data streams and to align data symbols across the plurality of data streams based on the minimal skip ordered sets.

2. The system of claim 1, wherein the deskew module further comprises a controller configured to align data symbols in the plurality of data streams by selectively adding at least one symbol to the minimal skip ordered sets in the plurality of data streams.

3. The system of claim 2, wherein the plurality of data streams comprises encoded symbols, the system further comprising a decoder module coupled to the compensation module and configured to decode the encoded symbols in the plurality of data streams.

4. The system of claim 3, wherein the plurality of data steams further comprises serial symbols, the system further comprising a deserializer module coupled to the decoder module and configured to convert the serial symbols in the plurality of data streams into parallel symbols, the parallel symbols being the encoded symbols in the plurality of data streams.

5. The system of claim 4, wherein the deskew module further comprises a collator coupled to the controller and configured to generate an output data stream by collating symbols in the plurality of data streams.

6. The system of claim 1, wherein the deskew module further comprises a plurality of data buffers each configured to store symbols in the plurality of data streams.

7. The system of claim 6, wherein the deskew module further comprises a controller coupled to the plurality of data buffers and the collator, the controller configured to align data symbols of the plurality of data streams stored in data buffers based on the minimal skip ordered sets by selectively adding at least one symbol to the minimal skip ordered sets.

8. The system of claim 7, wherein the controller is further configured to selectively delete at least one symbol in the skip ordered sets of the plurality of data streams at a tail of a first data buffer in the plurality of data buffers without storing the at least one deleted symbol in the plurality of data buffers and to selectively add at least one symbol to the minimal skip ordered sets at a head of the first data buffer without storing the at least one added symbol in the plurality of data buffers.

9. The system of claim 8, further comprising a collator coupled to the plurality of data buffers and configured to generate an output data stream by collating symbols in the plurality of data streams, wherein the controller is further configured to identify a minimal skip ordered set at a head of the first data buffer and write the at least one added symbol to the collator after the first minimal skip ordered set is output from the second data buffer.

10. The system of claim 6, wherein the predetermined number of symbols in each minimal skip ordered set is zero and each skip ordered set includes a tag indicating a location of the minimal skip ordered set in a data buffer of the plurality of data buffers.

11. The system of claim 1, wherein the compensation module is further configured to selectively modify the number of symbols in a skip ordered set by deleting each symbol in a skip ordered set and adding another symbol to the skip ordered set.

12. An apparatus for aligning data symbols in a plurality of data streams each having a data rate and comprising a plurality of symbols including data symbols and a skip ordered set comprising a number of symbols, the apparatus comprising:
a plurality of data buffers each configured to store symbols of the plurality of data streams; and
a controller coupled to the plurality of data buffers and configured to generate minimal skip ordered sets each having a same predetermined number of symbols by selectively deleting at least one symbol in the skip ordered sets of the plurality of data streams without storing the at least one deleted symbol in the plurality of data buffers and to align data symbols of the plurality of data streams stored in the plurality of data buffers based on the minimal skip ordered sets.

13. The apparatus of claim 12, wherein selectively deleting the at least one symbol in the skip ordered sets comprises identifying a skip ordered set in the plurality of data streams, selecting a number of symbols in the identified skip ordered set equal to the predetermined number of symbols, and storing the selected symbols of the identified skip ordered set into a data buffer of the plurality of data buffers.

14. The apparatus of claim 12, wherein the controller is further configured to align data symbols of the plurality of data streams stored in data buffers based on the minimal skip ordered sets by selectively adding at least one symbol to the minimal skip ordered sets without storing the at least one symbol added to the minimal skip ordered sets in the plurality of data buffers.

15. The apparatus of claim 14, further comprising a collator coupled to the controller and the plurality of data buffers, the plurality of data buffers further configured to output symbols of the plurality of data streams to the collator, the collator configured to generate an output data stream by collating symbols of the plurality of data streams output from the plurality of data buffers.

16. The apparatus of claim 15, wherein selectively adding the at least one symbol to the minimal skip ordered sets comprises identifying a minimal skip ordered set at a head of a data buffer in the plurality of data buffers and writing the at least one symbol added to the minimal skip ordered sets into the collator after the first data buffer outputs the identified minimal skip ordered set to the collator.

17. The apparatus of claim 12, wherein the predetermined number of symbols in each minimal skip ordered set is zero and each skip ordered set includes a tag indicating a location of the minimal skip ordered set in a data buffer of the plurality of data buffers.

18. The apparatus of claim 12, wherein the compensation module is further configured to selectively modify the number of symbols in a skip ordered set by deleting a symbol in a skip ordered set and adding another symbol to the skip ordered set.

19. A method for aligning data symbols in a plurality of data streams each having a data rate and comprising a plurality of symbols including data symbols and a skip ordered set comprising a number of symbols, the method comprising:
 generating minimal skip ordered sets each having a same predetermined number of symbols by selectively deleting at least one symbol in the skip ordered sets of the plurality of data streams; and
 aligning data symbols of the plurality of data streams based on the minimal skip ordered sets.

20. The method of claim 19, further comprising generating an output data stream by collating data symbols of the plurality of data streams.

21. The method of claim 19, wherein selectively deleting the at least one symbol in the skip ordered sets comprises:
 identifying a skip ordered set in the plurality of data streams;
 selecting a number of symbols of the identified skip ordered set equal to the predetermined number; and
 storing the predetermined number of selected symbols of the identified skip ordered set into a data buffer.

22. The method of claim 21, wherein aligning the data symbols of the plurality of data streams based on the minimal skip ordered sets comprises selectively adding at least one symbol to the identified skip ordered set without storing the at least one added symbol into the data buffer.

23. The method of claim 19, wherein the predetermined number of symbols is zero, and generating the minimal skip ordered sets each having a same predetermined number of symbols comprises:
 deleting each symbol in each of the skip ordered sets; and
 generating a tag for each of the minimal skip ordered sets for indicating a location of the minimal skip ordered set in a data buffer.

24. The method of claim 19, wherein the selectively deleting the at least one symbol in the skip ordered sets comprises deleting each symbol in a skip ordered set and adding another symbol to the skip ordered set.

\* \* \* \* \*